(12) United States Patent
Holland

(10) Patent No.: US 7,738,949 B2
(45) Date of Patent: Jun. 15, 2010

(54) METHOD AND APPARATUS FOR SPECTRUM ESTIMATION

(75) Inventor: Alexander Holland, West Linn, OR (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 129 days.

(21) Appl. No.: 12/037,407

(22) Filed: Feb. 26, 2008

(65) Prior Publication Data

US 2009/0216137 A1 Aug. 27, 2009

(51) Int. Cl.
*A61B 5/04* (2006.01)
(52) U.S. Cl. ...................................... 600/512
(58) Field of Classification Search ............... 342/26 R; 382/100, 131, 276; 702/2, 66, 41; 709/223, 709/224; 600/508
See application file for complete search history.

(56) References Cited

U.S. PATENT DOCUMENTS

| 7,336,982 | B2 | 2/2008 | Yoo |
| 7,403,875 | B2 * | 7/2008 | Vogel et al. ................. 702/189 |
| 2002/0165471 | A1 | 11/2002 | Halperin et al. |
| 2005/0256415 | A1 | 11/2005 | Tan et al. |

FOREIGN PATENT DOCUMENTS

KR 1020070121346 12/2007

OTHER PUBLICATIONS

Recursive Fourier Transform Algorithms with Integrated Windowing, Signal Processing 87 (2007) 1003-1013; first available on line Oct. 17, 2006 at www.sciencedirect.com; J. Gronczynski.*

N. R. Lomb; Least-Squares Frequency Analysis Of Unequally Spaced Data; School of Physics, University of Sydney, N.S.W., Australia; May 15, 1975.

Jeffrey D. Scargle; Studies In Astronomical Time Series Analysis, II. Statistical Aspects Of Spectral Analysis Of Unevenly Spaced Data; The Astrophysical Journal; Dec. 15, 1982; pp. 835-853, vol. 263; The American Astronomical Society; published in USA.

American Heart Association Inc.; European Society Of Cardiology; Guidelines—Heart Rate Variability— Standards Of Measurement, Physiological Interpretation, And Clinical Use; Task Force of The European Society of Cardiology and The North American Society of Pacing and Electrophysiology (Membership of the Task Force listed in the Appendix); European Heart Journal, vol. 17, Mar. 1996, pp. 354-381: published in U.K.

(Continued)

*Primary Examiner*—George Manuel
*Assistant Examiner*—Robert N Wieland
(74) *Attorney, Agent, or Firm*—Hiscock & Barclay, LLP

(57) ABSTRACT

The invention relates to a method for transforming physiological data from the time domain to the frequency domain. The method includes the steps of: providing a plurality of digital data in the time domain; providing a microcomputer programmed to run a recursive Fourier transform estimation algorithm; calculating, for each newly received digital data in the time domain, an integer index using modulo(N) arithmetic based on a time the each newly received data was received; selecting a frequency vector from a plurality of N frequency vectors using the integer index; and updating the plurality of frequency coefficients according to a recursive equation including the selected frequency vector as an input variable. The invention also relates to an apparatus that performs a recursive Fourier transform estimation algorithm to convert data in the time domain to data in the frequency domain.

23 Claims, 8 Drawing Sheets

OTHER PUBLICATIONS

Miles S. Ellenby, James McNames, Susanna Lai, Bruce A. McDonald, Donald Krieger, Robert J. Sclabassi, Brahm Goldstein; Uncoupling And Recoupling Of Autonomic Regulation Of The Heart Beat In Pediatric Septic Shock; Shock, Oct. 2001, pp. 274-277, vol. 16, No. 4; Oregon Health Sciences University, Portland, Oregon; published in USA.

Gari D. Clifford and Lionel Tarassenko; Quantifying Errors In Spectral Estimates Of HRV Due To Beat Replacement And Resampling; IEEE Transactions on Biomedical Engineering, vol. 52, No. 4, Apr. 2005; pp. 630-638.

Tran Thong; Real-time Evaluation Of Spectral Heart Rate Variability; Proceedings of the 28th IEEE EMBS Annual International Conference; Aug. 30-Sep. 3, 2006; pp. 1768-1771; published in USA.

Tran Thong, James McNames, Mateo Aboy; Lomb-Wech Periodogram for Non-uniform Sampling; Proceedings of the 26$^{th}$ Annual International Conferene of the IEEE EMBS; Sep. 1-5, 2004; San Francisco, CA, USA.

International Search Report for PCT/US2009/034366, mailed Sep. 1, 2009 (11 pages).

* cited by examiner

| SPECTRAL POWER | ABBREV. | FREQUENCY RANGE (Hz) |
|---|---|---|
| ALL FREQUENCIES | TOTAL HRV | 0.000-0.500 |
| ULTRA-LOW FREQUENCY | ULF | 0.000-0.003 |
| VERY LOW FREQUENCY | VLF | 0.003-0.040 |
| LOW FREQUENCY | LF | 0.040-0.150 |
| HIGH FREQUENCY | HF | 0.150-0.400 |
| VERY HIGH FREQUENCY | VHF | 0.400-0.500 |
| LOW/HIGH FREQUENCY RATIO | LF/HF | NA |

| NUMBER OF MISSING BEATS | RECURSIVE LEAST SQUARES | LOMB-SCARGLE |
|---|---|---|
| | (MEAN, SRD) | (MEAN, SRD) |
| 1 | (0.6166, 0.0053) | (0.5960, 0.0049) |
| 2 | (0.6163, 0.0077) | (0.5960, 0.0070) |
| 3 | (0.6156, 0.0092) | (0.5954, 0.0086) |
| 4 | (0.6149, 0.0107) | (0.5950, 0.0101) |
| 5 | (0.6149, 0.0120) | (0.5953, 0.0112) |
| 6 | (0.6140, 0.0129) | (0.5947, 0.0119) |
| 7 | (0.6137, 0.0140) | (0.5948, 0.0129) |
| 8 | (0.6139, 0.0143) | (0.5951, 0.0134) |
| 9 | (0.6120, 0.0153) | (0.5932, 0.0146) |
| 10 | (0.6119, 0.0162) | (0.5934, 0.0149) |
| 11 | (0.6121, 0.0165) | (0.5935, 0.0158) |
| 12 | (0.6106, 0.0174) | (0.5928, 0.0167) |
| 13 | (0.6115, 0.0191) | (0.5933, 0.0181) |
| 14 | (0.6105, 0.0186) | (0.5930, 0.0176) |
| 15 | (0.6096, 0.0202) | (0.5924, 0.0188) |
| 16 | (0.6100, 0.0200) | (0.5932, 0.0192) |
| 17 | (0.6087, 0.0205) | (0.5917, 0.0196) |
| 18 | (0.6078, 0.0213) | (0.5894, 0.0206) |
| 19 | (0.6081, 0.0207) | (0.5916, 0.0199) |
| 20 | (0.6079, 0.0219) | (0.5918, 0.0210) |
| 21 | (0.6070, 0.0215) | (0.5909, 0.0202) |
| 23 | (0.6055, 0.0232) | (0.5903, 0.0218) |
| 24 | (0.6063, 0.0237) | (0.5907, 0.0229) |
| 25 | (0.6065, 0.0238) | (0.5881, 0.0234) |
| 26 | (0.6062, 0.0237) | (0.5898, 0.0236) |
| 27 | (0.6032, 0.0242) | (0.5878, 0.0242) |
| 28 | (0.6044, 0.0246) | (0.5897, 0.0236) |
| 29 | (0.6042, 0.0248) | (0.5863, 0.0248) |
| 30 | (0.6044, 0.0265) | (0.5896, 0.0262) |

FIG.10

METHOD AND APPARATUS FOR SPECTRUM ESTIMATION

FIELD OF THE INVENTION

This invention relates generally to spectrum estimation and more particularly to a time domain to frequency domain transformation where data is non-uniformly spaced in time or where there is missing data.

BACKGROUND OF THE INVENTION

A great variety of electronic sensors, ranging from sensors used in astronomical studies to sensors used for monitoring physiological parameters of the human body, provide electrical signals representing desired measurements. Beyond the realm of astronomy and medicine, electronic sensors now pervade in all aspects of our lives and throughout our environment.

In data collection, an electronic converter, such as an analog to digital converter ("ADC") generally receives an electrical signal from one or more sensors and produces digital data at a regular rate (discrete data points in time) representing each converted measurement value. Such streams of digital data can be displayed on a graph as data points plotted in time illustrating how data changes in the "time domain". In a time domain representation, the horizontal or independent axis represents time.

Where signals or aspects of signals, such as physiological signals, change at almost periodic rates, such as the time interval between successive heart beats as measured using an electrocardiogram, it can also be of interest to transform such non-uniformly spaced in time data to the "frequency domain". In a frequency domain representation, the horizontal or independent axis represents frequency, while the vertical axis is a complex number representing the amplitude and phase of the corresponding frequency. Frequency domain graphs are commonly presented in a form known as a "power spectrum", a graph showing the squared amplitude of each estimated frequency over a range of frequencies and ignoring the phase. The mathematics used to convert or transform data acquired at uniformly spaced intervals in time from the time domain to the frequency domain is well understood. The method of choice for such conversion or transformation from time domain to frequency domain is generally the discrete Fourier transform ("DFT") most often accomplished by a relatively fast mathematical algorithm known as the Fast Fourier Transform ("FFT").

The DFT and FFT routines can provide a means of transformation for optimal circumstances of data collection (e.g. data recorded accurately at uniform intervals of time and with no missing data points). However, DFT and FFT routines perform poorly where points are missing in time or where data sampling does not occur with uniform spacing. In many fields of data collection, data points can be occasionally missing or can occur at non-uniform periods in time. For example a human heart beat generally has a non-uniform rhythm reflecting both a range of normal human activities as well as, in some cases, heart disorders. Also, in astronomical studies, it is common place for data to be missing due to signals falling below detection levels or signals lost in noise.

One existing technique interpolates or "guesses" what missing data points should have been, based on earlier and later acquired points. The "interpolated" data points are "forced" into the missing or uniformly spaced data point positions to form a corrected data set now suitable for transformation by FFT. Because interpolation techniques "manufacture" missing data points or apply mathematical processes to move data points to uniform time spacings in order to apply an FFT or DFT routine, they can unintentionally create a data set that does not produce an accurate result in the frequency domain.

There are methods that can directly perform a transformation to a power spectrum without first performing an interpolation. The "Lomb-Scargle Transform" ("LST"), for example, was developed to analyze astronomical non-uniformly spaced data in time and missing data points. The resulting LST power spectrum is also known as a Lomb-Scargle periodogram. Unfortunately, the LST requires a large number of mathematical operations and therefore fast processing speeds. There has been some success in producing streamlined methods for the LST (analogous to how the FFT streamlines DFT calculations), however the streamlined LST techniques are still computationally intensive. Also, the LST is an "off-line" computational technique. In an off-line computational method, a large amount of computation must be repeated for new data points and new frequency transformations that overlap in time with previous data points and transformations. Off-line transformations are generally less suitable for "real-time" signal processing. For example, many types of medical equipment, such as ECG monitors used for heart rate monitoring, need to produce continual results as new data is being received. Existing LST frequency transformation techniques estimate only power in the frequency domain, and do not generate phase information.

What is needed is a method that requires far less computational resources than the existing LST related methods, that can generate phase information in the frequency domain, and that is suitable for real-time signal processing.

SUMMARY OF THE INVENTION

In one aspect, the invention relates to a method for transforming physiological data from a time domain to a frequency domain, including the steps of: (a) providing a plurality of digital data in the time domain; (b) providing a microcomputer programmed to run a recursive Fourier transform estimation algorithm; (c) initializing a plurality of frequency coefficients; (d) receiving the digital data in the time domain; (e) calculating, for each newly received digital data in the time domain, an integer index using modulo (N) arithmetic based on a time the each newly received data was received; (f) selecting a frequency vector from a plurality of N frequency vectors using the integer index; (g) updating the plurality of frequency coefficients according to a recursive equation including the selected frequency vector as an input variable; (h) performing iteratively steps (d) to (g) thereby transforming the received digital data in the time domain to data in the frequency domain; and (i) recording the data in the frequency domain for later use as output or as data for display to a user.

In one embodiment the recursive equation of step (g) includes an equation $R(n)=F(R(n-1), r(n), w(n))$, where R includes a set of frequency coefficients, $r(n)$ includes a value of the each newly received digital data in the time domain, and $w(n)$ includes the selected frequency vector.

In another embodiment, the equation $R(n)=F(R(n-1),r(n),w(n))$ includes an equation $R(n)=R(n-1)+(r(n)-w^T(n)R(n-1)/N)w^*(n)$.

In yet another embodiment, the equation $R(n)=F(R(n-1),r(n),w(n))$ includes an equation $R(n+1)=R(n)+\epsilon_k(n+1)(Nr(n+1)-w^T(n+1)R(n))w^*(n+1)$.

In yet another embodiment, the integer index using modulo (N) arithmetic of step (e) includes an equation $k = t_j f_s \mod(N)$, where N represents a number of frequency vectors.

In yet another embodiment, the method includes receiving digital data wherein the digital data is discrete digital data that occurs at a quantized measurement period in time, and the digital data is not equally spaced in time.

In yet another embodiment, step (h) further includes a recursive computation using data from only within a sliding time window.

In yet another embodiment, step (h) further includes discounting older digital data inversely proportional to how far in the past the older digital data was observed.

In yet another embodiment, step (g) includes calculating a prediction error using a present set of coefficients in the in the frequency domain times a vector and applying vector addition to generate a new updated set of coefficients in the frequency domain.

In yet another embodiment, step (g) includes the term:

$(r(n) - w^T(n)R(n-1)/N)$.

In yet another embodiment, step (g) includes computing with a complexity of order N a set of coefficients in the frequency domain.

In yet another embodiment, the digital time data includes at least one time domain signal representing physiological signals from a heart.

In yet another embodiment, the method further includes the step of: (h), diagnosing a condition of a human heart based on the recorded data in the in the second domain produced by step (g), and wherein the second domain is the frequency domain.

In yet another embodiment, for each newly received digital data in the time domain only a selected subset of said set of frequency coefficients is updated.

In another aspect, the invention features an apparatus to transform digital data representing at least one time domain signal to data in the frequency domain including an electronic circuit configured to receive digital data representing at least one time domain signal. The apparatus also includes a microcomputer in communication with the electronic circuit. The apparatus also includes a computer program recorded on a machine-readable medium. The computer program is configured to perform the steps of a recursive Fourier transform estimation algorithm when running on the microcomputer. The apparatus is configured to calculate, for each newly received digital data in the time domain, an integer index using modulo(N) arithmetic based on a time the each newly received digital data was received, to select a frequency vector from a plurality of N frequency vectors using the integer index, and to update the plurality of frequency coefficients according to a recursive equation including the selected frequency vector as an input variable, to transform the digital data representing at least one time domain signal to data in the frequency domain, and to record the data in the frequency domain for later use as output or as data for display to a user.

In one embodiment, the computer program is configured to perform the steps of a recursive Fourier estimation algorithm when running on the microcomputer is configured to compute with a complexity of order N the equation $R(n) = F(R(n-1), r(n), w(n))$, where R includes a set of frequency coefficients, $r(n)$ includes a value of the each newly received digital data in the time domain, and $w(n)$ includes the selected frequency vector.

In another embodiment, the equation $R(n) = F(R(n-1), r(n), w(n))$ includes an equation $R(n) = R(n-1) + (r(n) - w^T(n)R(n-1)/N)w^*(n)$.

In yet another embodiment, the equation $R(n) = F(R(n-1), r(n), w(n))$ includes an equation $R(n+1) = R(n) + \epsilon_k(n+1)(Nr(n+1) - w^T(n+1)R(n))w^*(n+1)$.

In yet another embodiment, for each newly received digital data in the time domain, an integer index using modulo(N) arithmetic includes an equation $k = t_j f_s \mod(N)$, where N represents a number of frequency vectors.

In yet another embodiment, the apparatus includes an electrocardiogram ("ECG") apparatus and the digital data is representative of the operation of a heart.

In yet another embodiment, the digital data representative of the operation of a heart includes data missing one or more data elements in a time series.

In yet another embodiment, the electronic circuit configured to receive digital data further includes a comparator configured to receive a digital datum when a signal of interest crosses a preset threshold.

In yet another embodiment, for each newly received digital data in the time domain only a selected subset of said set of frequency coefficients is updated.

BRIEF DESCRIPTION OF THE DRAWINGS

For a further understanding of these and objects of the invention, reference will be made to the following detailed description of the invention which is to be read in connection with the accompanying drawing, where:

FIG. 10 shows a table of the exact mean and variance of the LF/HF power ratio estimates for the experiment of FIG. 8.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The description is divided into two parts. Part I describes generally the overall RFT invention and several exemplary embodiments including simulations that contrast RFT based spectrum estimation to the prior art LST based method. For those more skilled in the art, Part II describes, according to my best present understanding, a theoretical basis for the inventive methods.

Part I: An Iterative Method for Transformation to the Frequency Domain:

The invention pertains to an iterative method for transformation to the frequency domain, using recursive least squares (RLS) optimization. The recursive least squares Fourier transform, which I refer to as a recursive Fourier transform (RFT), works for non-uniform spaced input time samples, and therefore the RFT can tolerate missing samples and does not require sample data interpolation to uniform time spacings.

Figure 1:
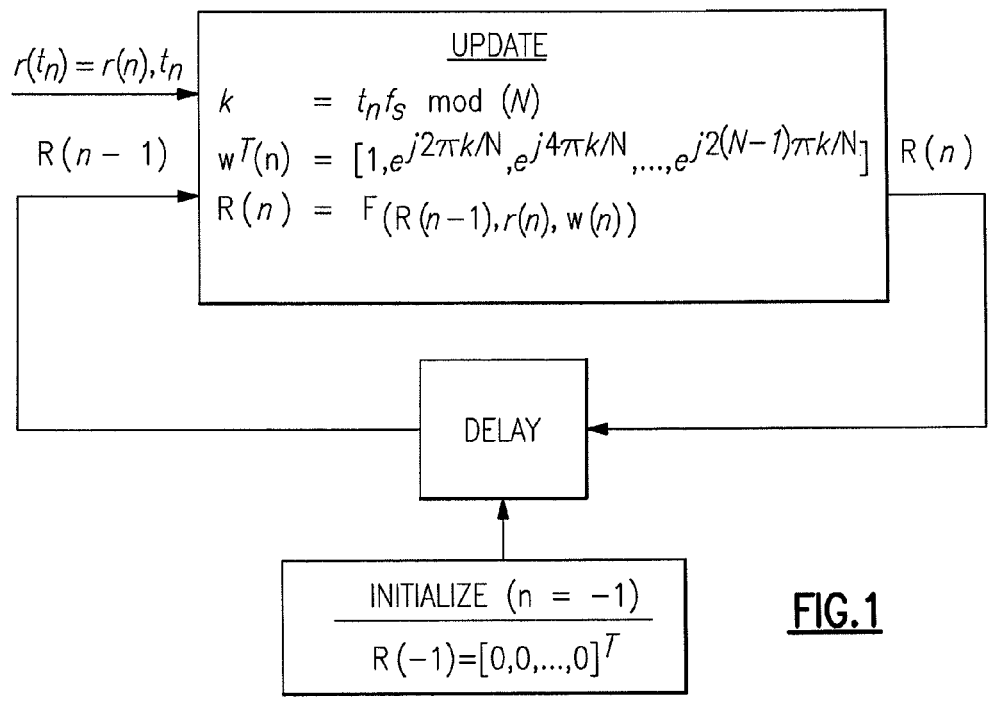
FIG. 1 shows a flow diagram illustrating one embodiment of the inventive RFT spectrum estimation method for non-uniform spaced data.

The flow diagram of FIG. 1 illustrates one embodiment of the inventive RFT method for non-uniform spaced data. New data to be analyzed for spectral content is input as r(n). In this illustration, successive input data is separated in time and occur at times $t_n$, and $f_s$ is a "time resolution frequency". I.e. $1/f_s$ represents the time unit by which $t_n$, is measured in integral multiples. $f_s$ can be viewed as the frequency of a digital counter used to measure the value of each $t_n$. (As will be described later, input data need not be limited to data spaced in time.) Thus in the embodiment of FIG. 1, $k=t_j f_s$ mod(N), the product of $t_n * f_s$ will always be an integer. N represents the number of frequency vectors. Integer index k can then be selected based on modulo N arithmetic, where index k is used to select a particular frequency vector w (n) to be updated. Applying the function $$R(n)=F(R(n-1),r(n),w(n)) \tag{I-1}$$

to new data r(n), the frequency vector w (n) selected by index k, and an initialized or previously calculated R(n−1) calculates a revised set of frequency coefficients R(n). As illustrated in FIG. 1, the method continues iteratively wherein each successive new data point is operated on as described using the last most recent calculated R(n) which is renamed to R(n−1) for each successive iterative calculation. It takes some number of cycles, perhaps comparable to N to develop substantially accurate frequency coefficients. Once substantially accurate frequency coefficients have been achieved, subsequent updates of the frequency coefficients, calculated in each successive iteration on receipt of each new r(n) are also accurate. Generally the function F includes a prediction error calculated from a mathematical comparison of the latest data with the previously calculated frequency coefficient vector. It is further contemplated that various types of filtering (e.g. noise filtering) and weighting factors can be include in F. Moreover an error term developed within the function F can be filtered before each new vector R(n) is calculated.

Figure 2:
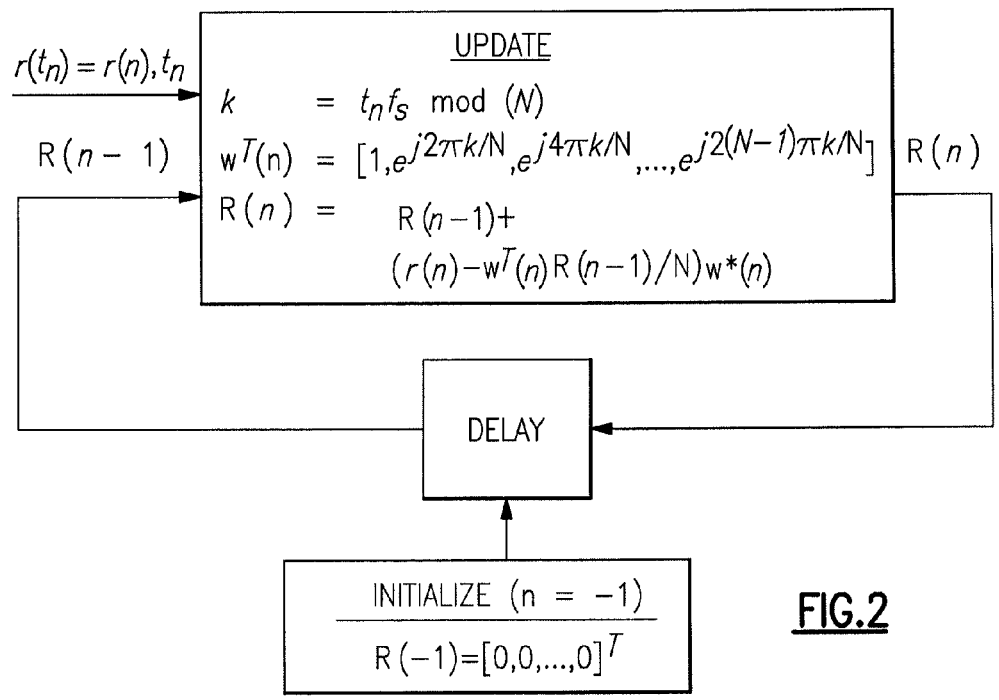
FIG. 2 shows a flow diagram illustrating another embodiment of the inventive RFT spectrum estimation method for non-uniform spaced data.

Turning now to FIG. 2, I describe the inventive RFT method for non-uniform spaced data in more detail where the Function F is defined as:

$$R(n)=R(n-1)+(r(n)-w^T(n)R(n-1)/N)w^*(n) \tag{I-2}$$

In the embodiment of FIG. 2, the frequency coefficients of the previous iterative calculation R(n−1) are updated by a frequency vector weighted by an error term that I sometimes refer to as the "prediction error". In the prediction error, $(r(n)-w^T(n)R(n-1)/N)$, the $w^T(n)R(n-1)/N$ term effectively calculates a prediction for the newest r(n) value using the present value for the Fourier coefficient vector R(n−1). The current index k value selects the particular frequency vector, $w^T(n)$, to use for the prediction. The prediction error is then multiplied by the complex conjugate of the selected frequency vector, w*(n), to form a frequency update vector. Finally, the frequency update vector is added to R(n−1) to generate a new set of frequency coefficients R(n). Iterative calculations according to FIG. 2 can be continued indefinitely for each successive received data r(n) along with its time of reception, $t_n$. The prediction error can also be viewed as including a scalar prediction error weighting term.

RFT Spectrum Estimation Compared to Prior Art LST Methods:

In the description that follows, I now compare the performance of RFT based spectrum estimation, using the embodiment of EQ. I-2, with the prior art LST spectrum estimation. Because the true nature of field collected physiological signals is unknown (e.g. which part is true signal versus noise, what is the true interpretation, etc.), I use simulated signals whose characteristics are known. First, I present two illustrative spectrum estimation examples using simulated signals with known spectra.

As I show in the first two examples below, the inventive RFT spectrum estimation method is particularly well suited to biomedical applications, such as for the analysis of physiological signals. Many types of physiological signals are semi-periodic or contain missing data points. Thus, even where data is typically sampled at a regular sample rate, a derived data set representing a reoccurring feature or characteristic event in the original data, while appearing on quantized time intervals (i.e. a varying integer number of time sample periods apart, where the time sample period is the reciprocal of the sample rate), does not occur at uniformly spaced time intervals. That is, the events themselves can and typically do occur non-uniformly in time, often widely non-uniform in time. Because one of my interests is in the application of the inventive method to physiological studies, such as studies of the signals from the mammalian heart, I used a heart-rate variability (HRV) simulation and study for examples 3 to 5.

A detailed comparison for estimation of the heart-rate variability (HRV) spectrum follows, which uses Monte Carlo methods to simulate quasi-stationary signals with various levels of randomly missing beats. Finally, I compare performance for an illustrative real ECG signal example.

SPECTRUM ESTIMATION EXAMPLES

Example 1

Randomly Varying Sample Time Interval: The first example provides an illustration of spectrum estimation performance in a situation where the time interval between samples varies randomly as multiple of the basic time quantization, $1/f_s$. I use the following sinusoidal signal:

$$r(t) = \sum_{i=-(M-1)/2}^{(M-1)/2} a_i e^{j2\pi f_i t} + v(t) \tag{I-3}$$

with M+1 frequencies, $f_i$, and corresponding amplitudes, $a_i$, which may be complex numbers. $v(t)$: $N(0,\sigma^2)$ is a normally distributed, zero mean additive random noise.

For the simulation of example 1, I chose $a_1=a_{-1}=a_2=a_{-2}$, $a_3=a_{-3}=a_4=a_{-4}=1$, and $f_1=10$, $f_{-1}=-10$ $f_2=20$, $f_{-2}=-20$, $f_3=100$, $f_{-3}=100$, $f_4=200$, $f_{-4}=200$ Hz, and standard deviation of $v(t)$ is $\sigma=0.01$. All other parameters are equal to zero. Let $f_s=512$ and sample the signal at discrete times.

$$t_n = \frac{3n + \lfloor z + 0.5 \rfloor}{f_s} \quad (I\text{-}4)$$

where z is a random number uniformly distributed between $-1.5$ and $1.5$. The offset of 0.5 causes the "floor function", $$\lfloor z \rfloor = \max\{n \in Z | n \leq z\} \quad (I\text{-}5)$$

to round (versus truncate). The sample time interval varies randomly from 1 to 5 times the basic time quantization, $1/f_s=1/512$ seconds. This signal has two closely spaced low frequency peaks along with two additional more widely spaced higher frequency peaks The 200 Hz peak is close to the 256 Hz Nyquist frequency implied by a sampling time quantization of $1/512$ seconds.

Example 2

Narrow Signal Bandwidth Within a Wide Analysis Bandwidth: This second example illustrates how to exploit a priori knowledge of R(n) in order to avoid significant amounts of computation. For example, if it is known that a certain portion of the coefficients R(n) are zero, they can be removed from the vector R(n) in EQ. I-2 (and hence are not stored or updated), and the corresponding components are removed from the complex exponential vectors.

A simple model for the "instantaneous heart rate" is:

$$h(t)=h_m+a_1 \cos(2\pi f_1 t)+a_h \cos(2\pi f_2 t)+v(t) \quad (I\text{-}6)$$

which is the heart rate equal to the reciprocal of the time interval between successive heart beats, a time interval that varies from beat to beat. Excluding the DC mean, two frequency peaks can roughly model the spectral characteristics of the heart rate, as discussed in more detail below. For this example, I chose a sampling rate of $f_s$; $=500$, and $h_m=60$ to be the mean number of beats per minute (bpm). Let $a_1=2$ bpm, $a_h=2.5$ bpm, $f_l=0.095$ Hz, $f_h=0.275$ Hz, and the standard deviation of $v(t)$ be $\sigma=0.2$. The time interval between heart beats is $r(t)=1/h(t)$, and the sequence of time points for each heart beat is given by:

$$t_0=0, t_{n+1}=t_n+\lfloor r(t_n)f_s+0.5 \rfloor/f_s \text{ for } n=0,1,2 \quad (I\text{-}7)$$

In this scenario, the time quantization $1/f_s$ is small and there are many hundreds of quantization intervals between samples. Each beat arrives about once every second, but the signal time quantization is $1/500$ seconds controlled typically by the original electrocardiogram sampling rate of 500 samples/sec.

A time resolution or quantization of $1/f_s=1/500$ implies a very large number of coefficients, N, to resolve the low frequencies. To achieve frequency resolution $f_s/N=0.01$ Hz, for example, EQ. I-2 would update N=50,000 frequency coefficients, where most of these coefficients are known a priori to be 0. Instead of updating coefficients over the entire bandwidth, I exploit this a priori information by including in R(n) only those frequency coefficients for which there may be non-zero values. In this particular example, I updated only N=512 frequencies that are equally spaced in the bands 0 to $f_b=1$ Hz and 255 to 256 Hz (or equivalently via aliasing to $-f_b=-1$ to 0 Hz). I computed only $1/256$ of the full Nyquist bandwidth implied by $f_s=512$, achieving an equivalent reduction in the amount of computation.

Thus, it can be seen that where there is prior knowledge that a subset of frequency coefficients is expected to have known values (zero for example), the RFT calculation can be significantly streamlined by iteratively updating only those frequency coefficients that are not known in advance (a subset of the set of frequency coefficients). This is unlike in the prior art, where all frequencies are computed each time an FFT is done. Such streamlining was shown in the previous example, where a priori knowledge about the frequency coefficient estimate, R(n) (e.g. that some of these coefficients will always be substantially zero) was used to dramatically reduce computation. By eliminating unnecessary computation, I was able to reduce the exemplary HRV computation by two orders of magnitude (rather than having updated a set of 50,000 coefficients, I only updated a set of 512).

Heart Rate Variability Spectrum Estimation:

The autonomic nervous and endocrine systems regulate the cardiac cycle causing beat to beat variation in the heart rate, also known as heart rate variability (HRV). It is believed that HRV studies can be used to assess organ system and biological feedback interactions. Clinical studies have indicated potential applications in trauma triage. HRV measurements (HRV metrices) might also be predictive of life threatening arrhythmias.

Figure 3:
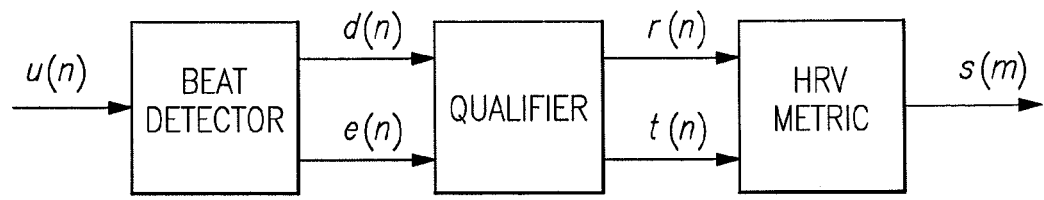
FIG. 3 shows a block diagram of an exemplary HRV measurement process.
Figure 4:
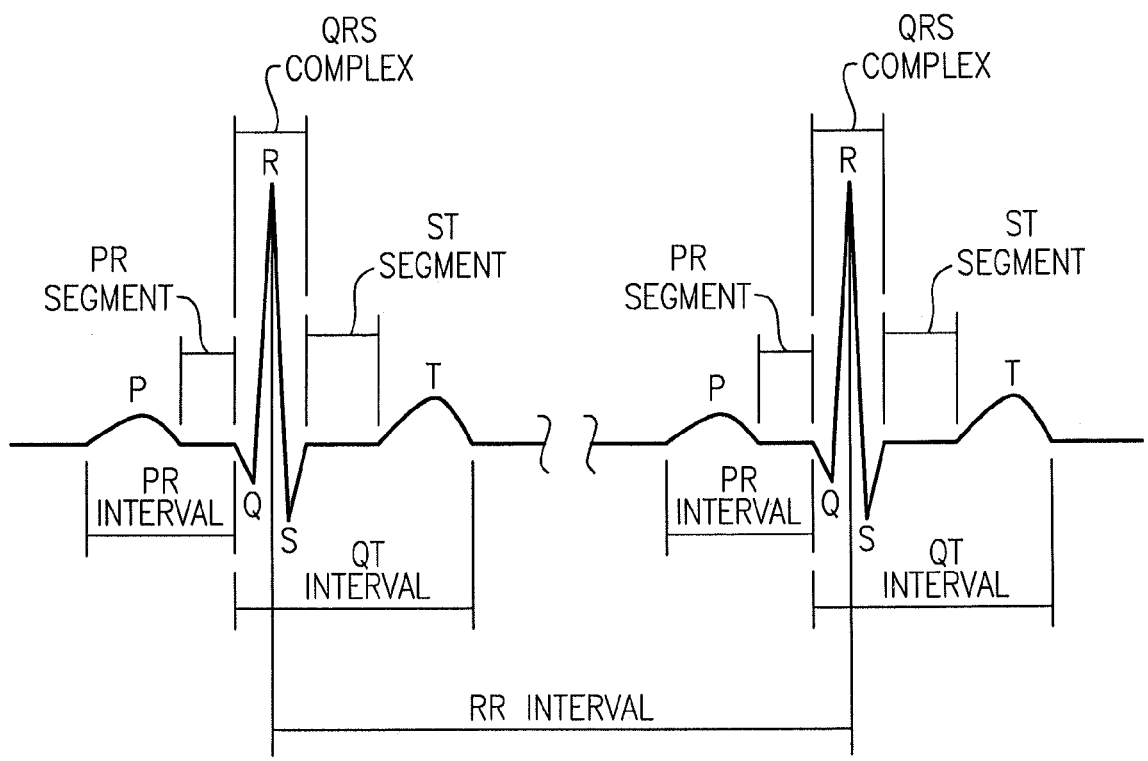
FIG. 4 shows a labeled graph of an exemplary ECG waveform.

HRV metrics measure time and frequency domain characteristics of the variation between successive heart beats. FIG. 3 illustrates the typical stages in a HRV measurement. HRV measurement includes (a) beat detection, (b) beat qualification, and (c) computation of a metric. u(n) is generally a discrete time sampled input signals), that includes one or more leads of an ECG, but other signals such as blood pressure or pulse oximetry waveforms may also be used. d(n) represents a fiducial point marking each successive detected cardiac cycle. e(n) provides additional information that aids in removing abnormal beats from HRV calculations, such as classifying each detected beat as normal or abnormal. Referring to the exemplary labeled ECG waveform of FIG. 4, the beat to beat or RR interval time series r(n) can be calculated from detected beats d(n) classified as normal only. t(n) is the time of occurrence for the corresponding r(n). s(m) represents metrics characterizing r(n), such as the HF/LF power spectrum energy ratio.

The input time signal vector:

$$u(n) = \begin{bmatrix} u_0(n) \\ u_1(n) \\ \vdots \\ u_{M-1}(n) \end{bmatrix} \quad (I\text{-}8)$$

has component signals $u_i(n)$ having oscillations that are synchronous with or correlate highly to ventricular contractions. Generally, u(n) is a discrete time sampled signal, but does not have to be, and generally u(n) includes one or more leads of an ECG, but other signals such as blood pressure or pulse oximetry waveforms can also be used.

The Beat Detector block estimates a single sequence of discrete times d(n) that represent a comparable fiducial point on each successive detected cardiac cycle. The peak of the R wave in the ECG QRS complex corresponding to left ventricular contraction is the most commonly used fiducial marker for the heart beat because of the relative ease and accuracy to measure it. As reported by Rompelman, et. al. (O. Rompelman, J. B. Snigders, and C. J. V. Spronsen, The measurement of heart rate variability spectra with the help of a personal computer, IEEE Transactions on Biomedical Engineering, vol. 29, no. 7, pp. 503-510, 1982) although it might be somewhat better to measure the start of the heart beat, i.e. atrial contraction represented by the ECG P wave, this signal is much more difficult to measure and its variation correlates highly with R wave variation anyway. Ideally, the Beat Detector block also outputs an "event signal" e(n) that classifies each detected beat as normal or abnormal in order to remove abnormal beats from HRV calculations.

For spectrum estimates of the instantaneous heart rate derived from variation of the beat to beat intervals, the beat variation of interest is that due to normal physiological regulation of the heart rate and not due to abnormal physiological function of the heart, such as atrial or ventricular ectopic beats. As reported by Clifford and Tarassenko (Quantifying errors in spectral estimates of hrv due to beat replacement and resampling, Biomedical Engineering, IEEE Transactions on, vol 52, no, 4, pp. 630-638, April 2005) abnormal beats can bias these measurements significantly. e(n) may also indicate missing beats or provide a quality measure for the accuracy of the estimated time d(n). Accuracy and precision of the HRV measurement can be directly dependent on the accuracy and precision of the Beat Detector.

The Qualifier block generates beat to beat or RR interval times r(n) calculated from normal detected beats d(n) only and generates the time of occurrence t(n) for each corresponding r(n). The RR interval is the time interval between successive heart beats that fluctuates naturally in time due to a tug of war between slow acting sympathetic and fast acting parasympathetic autonomic nervous system regulation. As reported by Clifford, et al., the respiratory sinus arrhythmia (RSA), a parasympathetic component of this regulation, is synchronous with respiration. As a result, a "high frequency" (HF) peak in the RR interval power spectrum appears at the respiration frequency. For example, 15 breaths a minute (1 breath every 4 seconds) generates a 0.25 Hz peak. A second peak in the RR interval spectrum typically occurs around 0.1 Hz. As reported in the literature, the cause of this "low frequency" (LF) 10 second oscillation is still under debate, but one explanation attributes it to baroreflex regulation associated with "Mayer waves" in the blood pressure signal. Activities or events, such as sleeping, exercise, mental activity, trauma, or natural circadian rhythms affect the relative autonomic influences on the heart and hence energies in the RR spectrum.

The HRV Metric block generates HRV measurements.

$$s(m) = \begin{bmatrix} s_0(m) \\ s_1(m) \\ \vdots \\ s_{N-1}(m) \end{bmatrix} \quad (I\text{-}9)$$

characterizing the variation in r(n). Typically the output time sample index m represents a sample period that is longer than the sample period represented by the input sample index n.

Figures 5, 6:
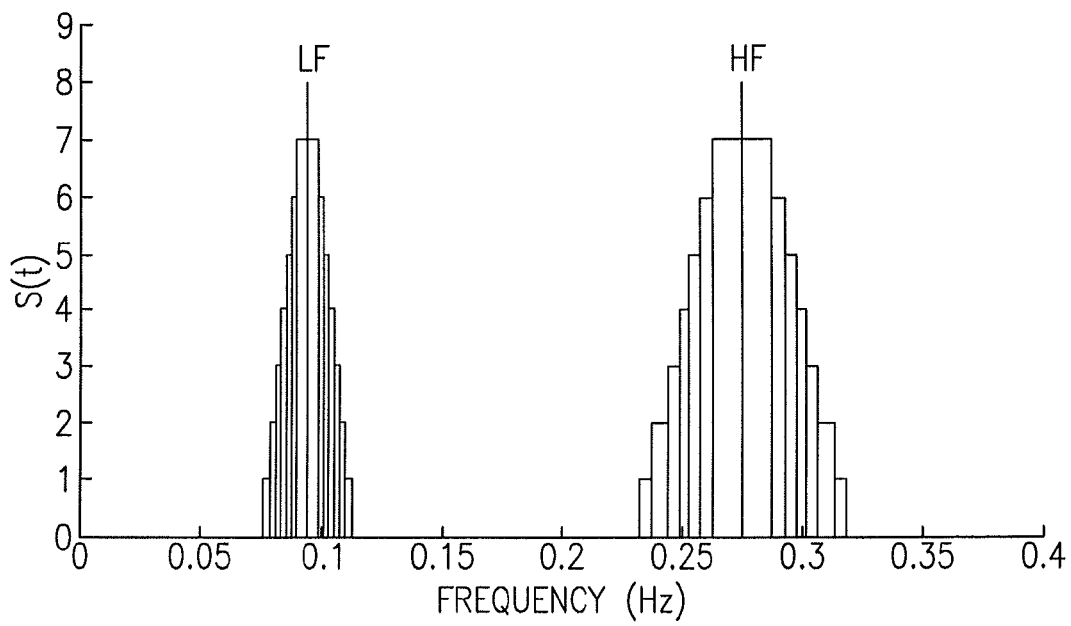
FIG. 5 shows one exemplary table of common frequency domain HRV measures.
FIG. 6 shows a histogram used to model non-stationarity in an instantaneous heart rate signal.

FIG. 5 shows a table of the most common frequency domain HRV measures according to a report by the The European Society of Cardiology and T. N. A. S. of Pacing & Electrophysiology, Heart rate variability standards of measurement, physiological interpretation, and clinical use, European Heart Journal, vol. 17, pp. 354-381, 1996. The low frequency (LF), high frequency (HF) and LF/HF ratio metrics can be of particular interest in our experiments, where the HRV spectrum is of the instantaneous heart rate, h(n), in beats per minute (bpm). If the time units are in seconds, s, for example, the power spectrum units are $s^2/Hz$ and total power in a frequency band is in units of $s^2$. One could also estimate the spectrum for the RR interval, r(n)=60/h(n) using exactly the same methods.

ECTOPIC BEATS: The Clifford and Tarassenko study concluded that the LST provides more accurate LF/HF estimates for RR interval data with ectopic beats than do FFT methods that first interpolate samples to uniform spacings. In order to compare our RFT estimates with results from this study, I adopted some of the same signal models, signal configurations, and experimental methods. This provided an independent verification of our LST implementation and also indirectly allowed us to compare the RFT to FFT methods.

In particular, the heart rate model is that of EQ. I-6, sampled using EQ. I-7. The model parameters match those of the Clifford and Tarassenko study and are $f_s$=1000, and $h_m$=60 bpm, $a_l$=2 bpm, $a_h$=2.5 bpm. The mean value for low frequency and high frequency parameters are $f_l$=0.095 Hz and $f_h$=0.275 Hz respectively. In addition, $f_l$ and $f_h$ change during the simulation to model non-stationarity, incrementing as follows:

$$f_l(n)=0.77+0.00056n \text{ for } 0 \le n \le 66,$$

$$f_h(n)=0.23+0.00130n \text{ for } 0 \le n \le 66 \quad (I\text{-}10)$$

Index n cycles up from 0 to 65 and then back down to 0, but not regularly. For each frequency, $f_l$ and $f_h$, the following Gaussian functions $S_l(f_l)$ and $S_h(f_h)$ respectively determine how many samples to generate at a particular frequency value before incrementing (decrementing) n to specify the next frequency value:

$$S_l(f_l) = \lfloor 8e^{-(f_l-0.095)^2/0.0002} \rfloor,$$

$$S_h(f_h) = \lfloor 8e^{-(f_h-0.075)^2/0.0010} \rfloor \quad (I\text{-}11)$$

Turning now to the histogram of FIG. 6, in order to model non-stationarity in the instantaneous heart rate signal model of EQ. I-6, the low frequency peak $f_l$ and high frequency peak $f_h$ increment and then decrement around a mean. $S_l(f_l)$ and $S_h(f_h)$ are integer valued Gaussian functions (See EQ. I-11) that respectively determine how many samples to generate at each frequency value before incrementing (decrementing) the frequency to the next value. I found that the histogram of FIG. 6 approximately replicates FIG. 1a as reported by Clifford and Tarassenko, indicating that I achieved a comparable model of non-stationarity. The max of 65 for n led to approximately 300 beats having this Gaussian distribution and hence a theoretical LF/HF power ratio of 2/2.5=0.64.

Example 3

Figure 7:
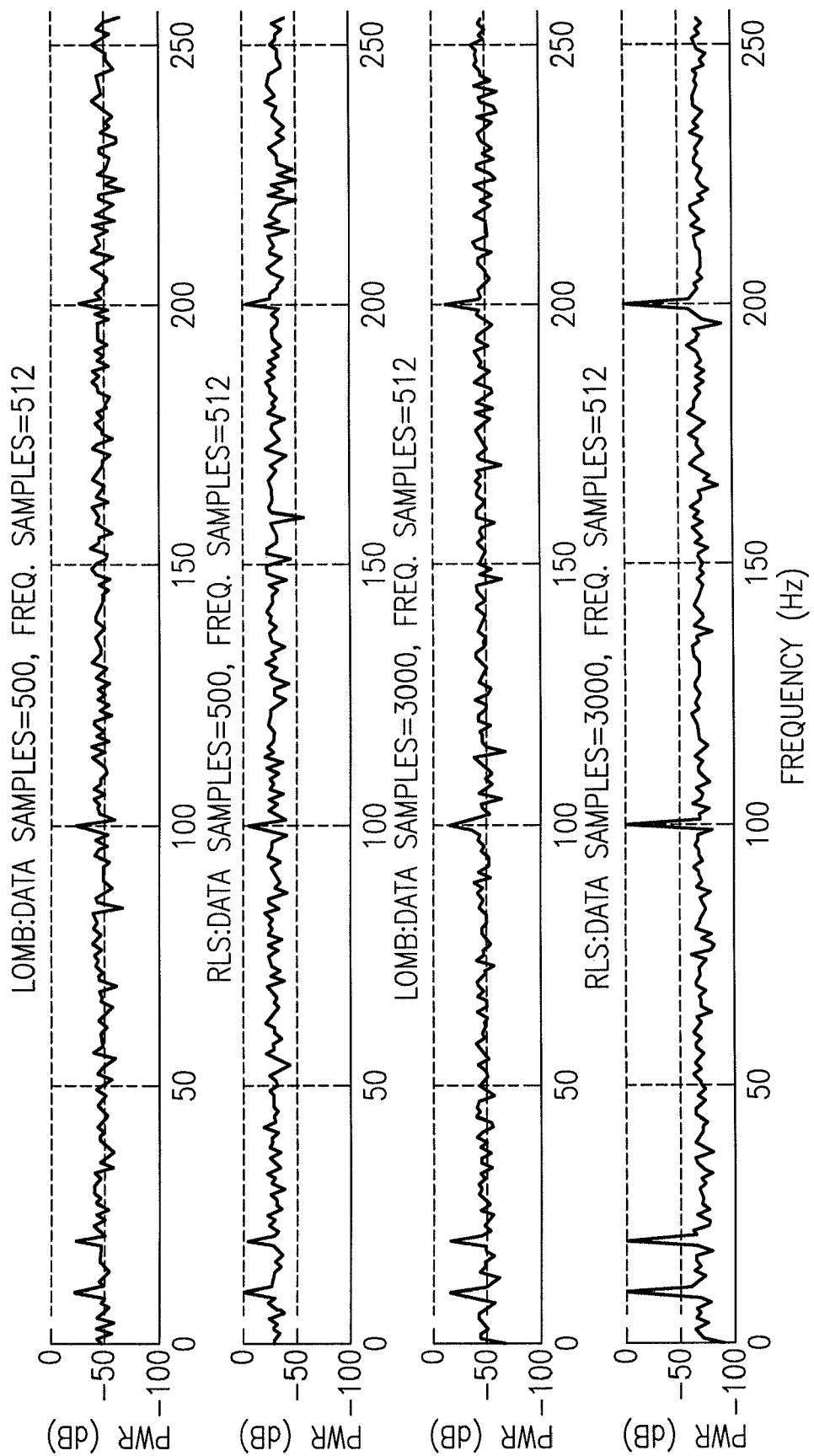
FIG. 7 shows graphs of power spectrum estimates comparing the LST of EQ. II-1 with the RFT of EQ. I-2.

FIG. 7 shows graphs of power spectrum estimates comparing the LST of EQ. II-1 with the RFT of EQ. I-2 at 512 equally spaced frequencies for a synthetic signal having 4 cosine frequencies and 1% noise. The sample time interval varied randomly from 1 to 5 times the basic time quantization of 1/512 seconds. FIG. 7 compares spectrum estimates using the first exemplary signal of EQ. I-3 with four sinusoidal frequencies and a sample time interval that varies randomly from 1 to 5 times the basic time quantization of 1/512 seconds.

In example 3, both estimators show all four frequency peaks. However, the RFT is more consistent for this stationary signal example in the sense that signal to noise ratio improves as more data samples are used in computing the estimate.

Example 4

Figure 8:
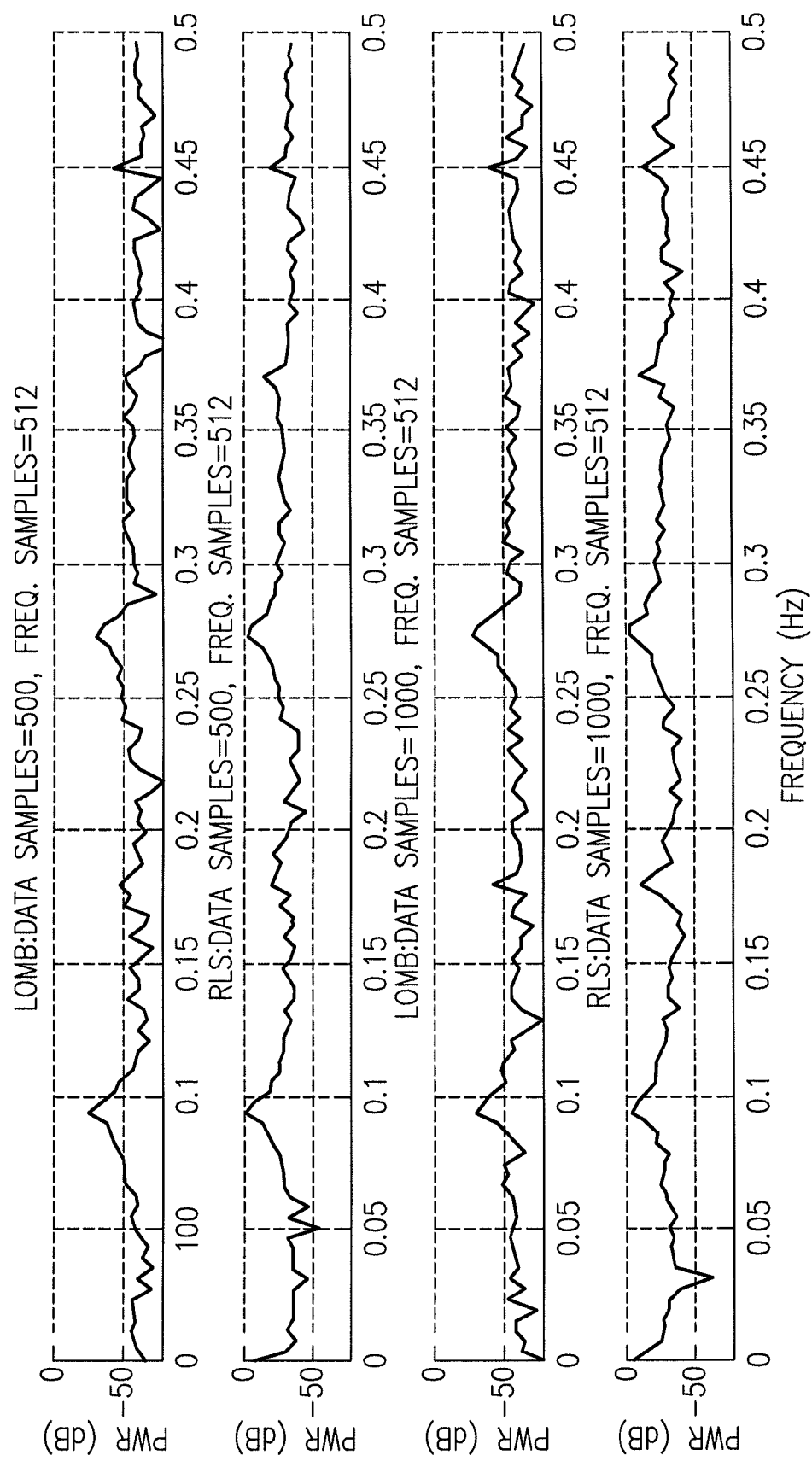
FIG. 8 shows graphs of power spectrum estimates comparing the LST of EQ. I-2 to the RFT of EQ. I-2 for a synthetic signal with two sinusoids emulating a variability in the heart rate.

FIG. 8 shows graphs of power spectrum estimates comparing the LST of EQ. II-1 to the RFT of EQ. I-2 where the input signal is a synthetic signal with two sinusoids emulating the variability in heart rate and having 1% noise. The estimate is of 512 equally spaced frequencies over the frequency band 0 to 1 Hz (a small fraction of the full 0 to 256 Hz band implied by the time quantization of $1/f_s=1/512$). Because samples were spaced on average 1 second apart, these estimates covered approximately 8.5 and 17 minute time windows. In example 4, 99.6% of the frequency coefficients in the full signal band ($f_s/2$) are known to be 0 and therefore not stored or updated. Both the RFT and LST estimators perform comparably in having very similar signal peak to noise floor ratios. The estimates of both methods do not appear to improve when using more data samples.

Example 5

Figure 9:
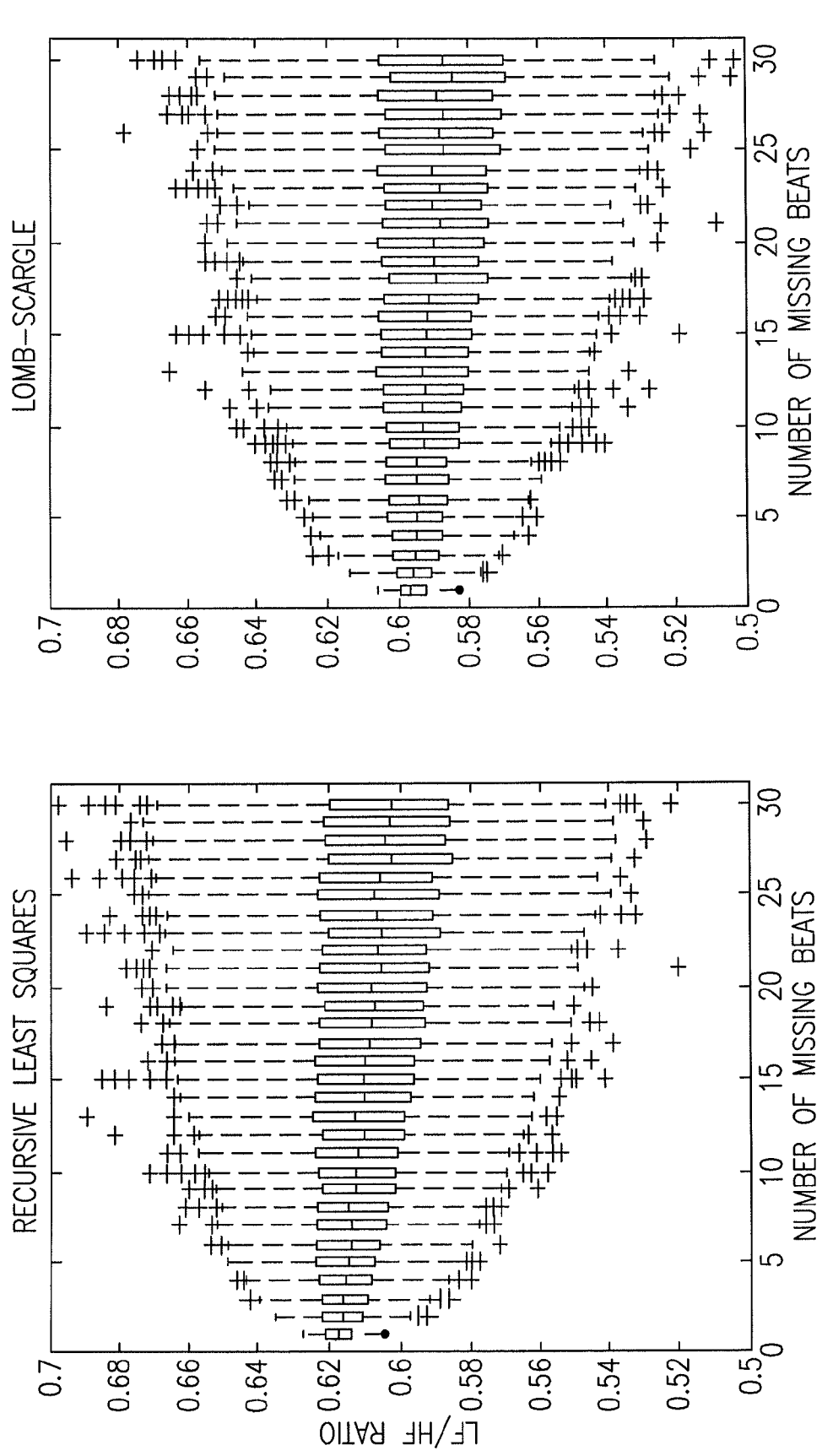
FIG. 9 shows two box plot graphs illustrating the results of a Monte Carlo HRV simulation experiment.

FIG. 9 shows two statistical box plots that compare LST and RFT estimates of the ratio of heart rate low frequency power (LF) power to high frequency (HF) power as a function of number of randomly missing beats in the input data. Each estimation used 300 consecutive heart beat intervals minus random beats simulated missing due to abnormal ectopic depolarization or noise. The input was a synthetic heart rate signal with non-stationary LF and HF peaks in its spectrum (See EQ. I-10 and EQ. I-11). The LF/HF power ratio is a known constant 0.64. Each box marks the middle 50% of the 1000 estimates made for each LF/HF value. The line in the box is the median. Vertical whiskers indicate maximum and minimum data values, except for outlier data values marked with plus signs.

The prior art LST method produces accurate estimates with mean value within 3 to 6% of the true value and with a few additional percent variance increasing as missing beats increase. The table of FIG. 10 shows the exact mean and variance of the LF/HF power ratio estimates corresponding to this experiment. The RFT method performs equally well as the LST (the RFT estimate has slightly less bias in this particular experiment), and hence by inference from results reported by Clifford and Tarassenko, performs better than FFT methods that first interpolate beats to create uniformly sampled data.

One advantage of the RFT is that it enables high quality spectrum estimation implementations in many embedded applications where other methods would be impractical or would not work nearly as well. As an example, suppose one desires an HRV spectrum, but is missing a few heart beats in a sequence of RR intervals that are naturally non-uniform spaced, as noted above. Typically a running 5 minutes of data or longer is the spectral window for which HRV frequencies are estimated. What values does one use for the missing intervals to make a direct FFT based method work? It might be best to display no answer for the period of missing beats rather than "manufacture" beats, however this might mean no answer for 5 minutes until a fall set of beats are obtained. The LST and the RFT methods work despite missing beats because they bypass the necessity for re-sampling or interpolation. For similar computational performance to RFT of EQ.

I-1, the LST must either buffer a minute or two of data (a beat only comes about every second), causing a minute or so of time delay before a spectrum can be computed, or take almost 2 orders of magnitude more CPU bandwidth for typical configuration than (RFT to compute an estimate on every beat.

In many embedded instruments, a single CPU is typically asked to handle many functions, and the arithmetic functions tend to use the bulk of its computational bandwidth, e.g. multiple filters applied to multiple signal channels, signal feature detection algorithms, pattern recognition, etc. In this regard, Fast LST methods typically require more than 10*log (N) times as many multiply/adds for each spectrum update than does the RFT of EQ. I-2. For a 512 point spectrum this is about $10*\log_2(512)=90$ times the CPU bandwidth used by the RFT, no matter what particular type of CPU is used or its multiplication efficiency. Overall, the ratios and scaling of trigonometric functions in the LST are also more complex to implement using fixed-point arithmetic, which is sometimes a more significant embedded computational issue than total arithmetic operations.

However, the Fast LST could in theory gain comparatively in computational efficiency by updating the spectrum 1/81 as often as the RFT method of EQ I-2. The relative total computational efficiency between EQ I-2 and the Fast LST depends on the data time window used for spectrum updates and the amount of window overlap. However, the requirement to buffer a history of data to minimize computation using the Fast LST introduces an additional time delay, which can be undesirable in biomedical contexts (e.g. QRS detection delay for cardioversion synchronization). For HRV, waiting 81 beats for a calculation, means an estimate comes out every minute 21 seconds, compared to every second for the RFT method.

The RFT method of EQ I-2 works analogously for any discrete basis functions. In particular, the method only demands that the discrete basis functions satisfy EQ. II-3, and therefore could be applied to estimate the transform coefficients in transform domains other than discrete Fourier, as in discrete Wavelets, for example.

Alternative Embodiment

Figure 11:
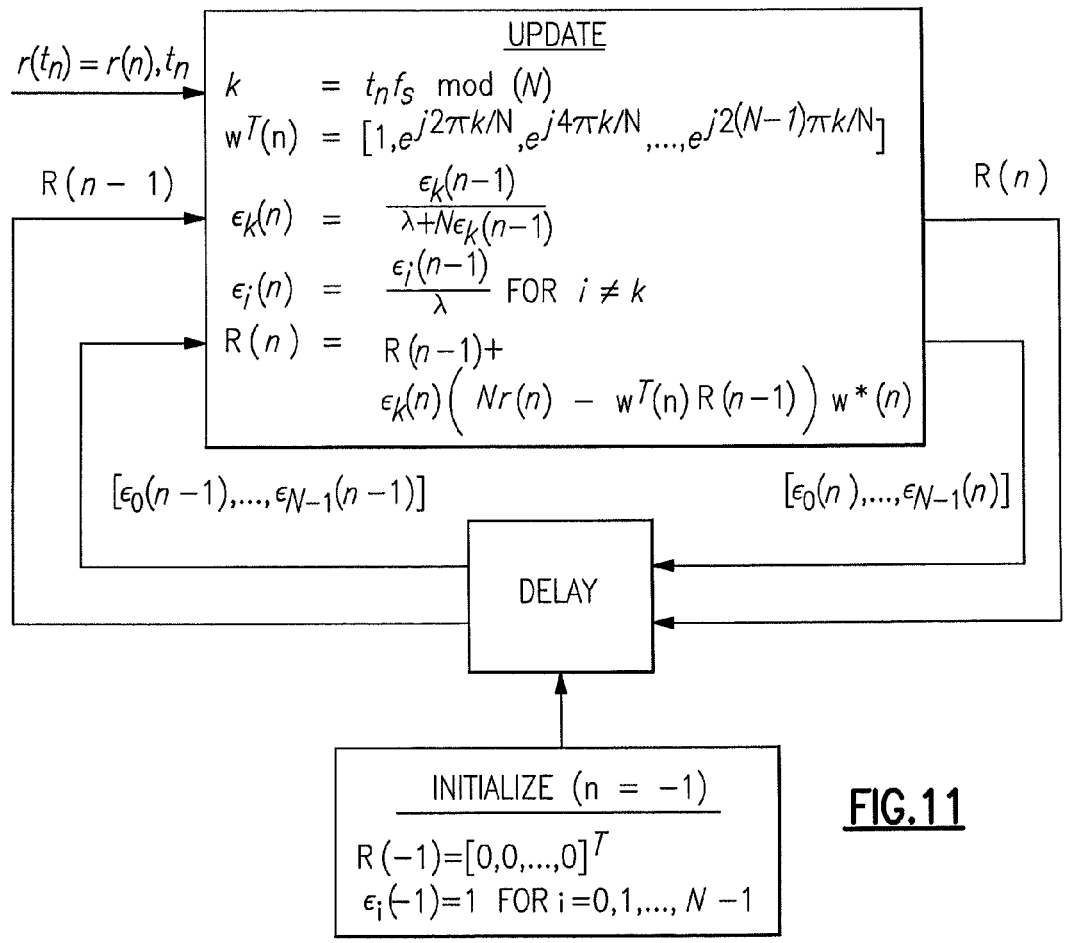
FIG. 11 shows a flow diagram illustrating yet another embodiment of the inventive RFT spectrum estimation method for non-uniform spaced data.

Turning now to FIG. 11, I describe another embodiment of the inventive RFT spectrum estimation method for non-uniform spaced data where the Function F is defined as:

$$R(n+1) = R(n) + \varepsilon_k(n+1)(Nr(n+1) - w^T(n+1)R(n))w^*(n+1) \quad (\text{I-12})$$

FIG. 11 shows a signal flow diagram where the iteration is shown equivalently from n−1 to n. The index n indicates a sequential relation between data in the iterative process. Note that it is unimportant to the inventive technique whether equations iterate from n to n+1 as in equation I-12, or from n−1 to n as in the exemplary flow diagram of FIG. 11. Because $w^T(n)$ is always a selection from the same finite set of complex sinusoidal values, computation is reduced further by storing precomputed values in memory. Also because these sinusoids are the same as used in Fast and Discrete Fourier Transforms, the same well-known methods that exploit sinusoidal function symmetries for storage efficiency will also work here (e.g. all values can be obtained from a quarter cycle of values with a frequency resolution of $2\pi/N$). Each iterative update retrieves the values it needs from memory. Note that for each iteration all values in the "update" box are recomputed. As can be seen in FIG. 1, $k=t_j f_s \mod(N)$ is first updated and therefore k is a different value on each iteration. Once each new k value is calculated, one "eigenvalue", where i=k, is updated as $$\varepsilon_k(n) = \frac{\varepsilon_k(n-1)}{\lambda + N\varepsilon_k(n-1)},$$

and all of the other eigenvalues (where i≠k) are updated as $$\varepsilon_i(n) = \frac{\varepsilon_i(n-1)}{\lambda}.$$

Iterative updating of an inverse autocorrelation matrix of eigenvalues avoids a direct iterative update of the matrix itself and also avoids explicit matrix by matrix and matrix by vector multiplications as shown in theoretical derivations below. By using RFT with eigenvalue (scalar) updates, the inventive method significantly reduces the computational load from order $N^3$ to order N. An iterative spectrum update according to the inventive method can be accomplished using far less computational resources than are required to perform either the Lomb-Scargle or the Fourier Transform.

SLIDING WINDOWS: All of the inventive RFT methods described above can also be viewed as operating over a "sliding window in time" that can in some embodiments, extend indefinitely far in the past by mathematically discounting past data or weighting the data in a manner inversely proportional to how far in the past it was encountered. With each new digital sample collected in time, the recursive calculation is updated and new frequency information is generated. When the first digital sample is received, such as when data acquisition first begins, the frequency values are closest to the initialized values and are the least meaningful. However, once a number of samples have been received, for example 1,000 samples, with each new sample received, the recursive method produces a new set of output frequency data estimates. Also, note that the weighting parameters (as shown in equation 5) are one example by which to "discount" older data. Therefore each new "best" frequency estimate can be had "one sample at a time" in real-time computations that use and exploit the past computational results in the sliding window.

In one embodiment a sliding time window computation can weigh digital data that falls within the time window, but not use older digital data that falls outside the sliding time window. In another embodiment, older digital data can be discounted inversely proportional to how far in the past the older digital data was observed, or viewed as a sliding time window that grows and extends indefinitely far in the past possibly as far back as to the first data sample that was observed.

Note that one difference between the sliding FFT and the recursive (iterative) approach in the patent is that the FFT does not make use of past computational results, A FFT computation according to the prior art uses all of the data in a window as a new raw data set to make a new computation of the frequency coefficients. The FFT does not make any use at all of previously computed results, such as a computation from even one sample time period past. For example an FFT computation using 1,024 samples from a window in the time domain computes an FFT on that set of data alone in isolation, without using any prior results, to generate a single frequency spectrum for each new set of many data points. By contrast, the inventive recursive method can update its last computation by leveraging each previous frequency coefficient estimate computation.

Applications of the Inventive RFT Method:

The RFT and spectral analysis method presented herein is not limited to any particular application, and as best as I presently understand the solution, generally applicable for recursive Fourier transform calculation and spectral analysis in all fields of endeavor. The RFT method for spectrum estimation is believed to be generally applicable to any field where time domain to frequency domain transformation is performed and particularly useful in the case of non-uniformly spaced data or missing data points. Exemplary fields of study where the invention can be used for spectral study include communications, spectroscopy, astronomy, etc.

With regard to general application of the inventive method, data points need not necessarily be taken with regard to time. The method works equally well, for example, with data taken in space, such as having unequally spaced distances between data points or missing data in space. In fact, the method works for any discrete sequence of data where the interval between the data is non-uniform, no matter what type of dimension or unit is used to characterize the data. While applications in distance and time are contemplated, the intervals between data can represent something else, such as an increase in mass or energy. I have provided a brief primer as Appendix B, to assist those less familiar with mathematical transformations used in the technical arts to better understand the universal applicability of the inventive RFT method to transformations involving units other than time and frequency.

It can now be seen that the inventive RFT method is universally applicable for transforming data from a first domain to a second domain. Data in the first domain can be, but is not limited to, data that can be represented by any standard unit of time, length, or mass and any unit that can be derived from those basic units. Suitable exemplary units of mass include, but are not limited to grams, pounds, ounces, etc. The inventive RFT algorithm is suitable for use for transforming data from a first domain having derived units such as, for example, units of thermodynamics or any type of electrical unit, including standard units of electrical measurement, such as volts, amperes, joules, ohms, etc. In fact any of the international system of units, or equivalent systems of units in length, time, and mass, can be used to represent input data, in a first domain, to the inventive RFT algorithm.

Another exemplary use of the inventive RFT method can be in the earth sciences. For example, in Meteorology there are many types of measurements where digital data is typically recorded in the time domain as non-uniformly sampled events ranging from the occurrence of all types of precipitation to the occurrence of storm systems. Wind gusts are another example of events that typically occur in nature that may have non-uniform, quasi-periodic oscillatory characteristics. In the Ocean sciences, the inventive RFT method might be particularly well suited to the study of tides.

As a further example of the universal applicability of the method, the first domain need not have any typical physical unit. For example, it may be a random variable with a probability distribution. The random variable is a function on a set of probabilistic outcomes, such as a count of the number of heads in 100 tosses of a two-sided coin. The probability distribution in turn is a function of the random variable. In the example case of the coin toss, the random variable is a pure numerical count that functions analogous to time in standard spectrum analysis. The differences between the random variables do not represent any physical unit other than differences in the count of the event (number of heads in this particular example case). However, it is often desired to know the spectrum of the probability distribution associated with the random variable, which is well-known as the "Characteristic Function" of the probability distribution. Using the inventive RFT method, the spectrum of a probability distribution can be estimated without having uniform spacing between the random variables. The first domain is a random variable with a known or estimated probability distribution. The second domain is the estimated Characteristic Function for the probability distribution. Note that a Characteristic Function for a probability distribution often uses $e^{jft}$ in its definition of the Fourier transform, while the standard definition of the Fourier transform uses $e^{-jft}$. The difference in the sign of the exponent makes no significant difference in my RFT method other than changing the sign of the exponential in w(n). Therefore, in the application of the inventive RFT method to probability distributions, digital data can be received as a digital value representing a random variable where the digital data is discrete digital data that can occur at a quantized measurement interval, and where the digital data is not equally spaced. Here, the second domain can represent the Characteristic Function for the random variable probability distribution.

Further, the inventive RFT algorithm can be generalized to estimate other types of transforms recursively. It is believed that the solution of EQ I-1 and its various related embodiments can be used at least with any discrete transform satisfying the property expressed by EQ. II-3.

Exemplary Apparatus to Perform the RFT Method

Figure 12:
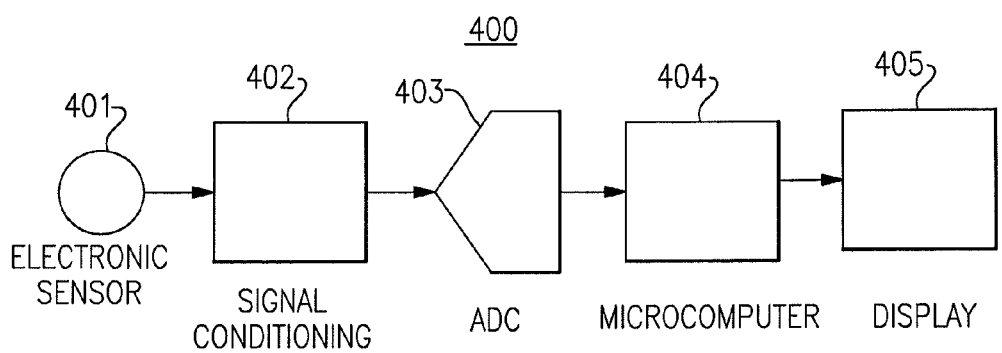
FIG. 12 shows a block diagram of an apparatus suitable for performing the inventive method.

A block diagram of one exemplary embodiment of an apparatus 400 suitable for performing the inventive method is illustrated in FIG. 12. An analog signal, such as might be provided by an electronic sensor 401 is electrically coupled to signal conditioning block 402. Signal conditioning block 402 typically includes a low pass anti-aliasing filer and can include other analog filtering suitable for a particular application. Such filtering is not unique to the instant invention. Analog to digital converter ("ADC") 403 receives analog signals from signal conditioning block 402 and generates digital values representative of the analog signals. ADC 403 typically converts and generates new data points at a "quantized" interval of time. Microcomputer 404 receives digital data from ADC 403. Microcomputer 404 can be configured to process the digital data according to, for example, the flow diagram of FIG. 1, FIG. 2, or FIG. 11. After initializing the Fourier coefficient vector, the algorithm performs a continuous recursive update as data is acquired. Spectrum results can be displayed in a graphical form, such on a display 405.

Note that while the exemplary apparatus of FIG. 12 shows an ADC 403 as the source of digital data, the invention is universally suitable for use with other types of digital data sources. The exemplary apparatus 400 typically acquires new digital data via ADC 403 at a relatively constant sample rate, such as determined by a clock signal (not shown in FIG. 12). However, it must be emphasized that apparatus 400 merely represents one possible digital source suitable for use with the inventive method, and that the method supports very atypical usage, such as clocking ADC 403 at very unequal clock time intervals (sampling at a very unequal rate) or extracting non-uniformly time spaced properties of the ADC 403 data and directly computing the spectrum of these properties. It is also unimportant when using the inventive RFT method what is the original digitization scheme or source of digital data. For example, suppose the values of a digital clock are recorded when a comparator output indicates that a signal of interest crosses a preset threshold. The clock values associated with these events (along with any associated data values) are suitable data inputs for the RFT algorithm to estimate the spectrum.

DEFINITIONS

Recording the results from a RFT operation, such as, for example, recording results in the frequency domain, is understood to mean and defined herein as "writing" output data to a storage element or device. For example, recording the data in the frequency domain for later use as output or as data for display to a user can include, but is not limited to, writing data to random access memory ("RAM") (volatile or non-volatile), SRAM, DRAM, and EEPROM. Such digital memory elements or chips can be standalone memory devices, or can be incorporated within a programmable array, such as a field programmable array ("FPGA"), or within a microcomputer. "Writing output data" is defined herein as including writing transformed data to registers within a microcomputer. Memory elements or devices can also include other writing means, such as writing digital data to a magnetic storage device, such as a hard drive, magnetic technology disc, or other disc media, such as an optical CD media, or DVD media.

I define "microcomputer" herein as synonymous with microprocessor, microcontroller, and digital signal processor ("DSP"). It is understood that memory used by the microcomputer, including for example an RFT algorithm coded as "firmware" can reside in memory physically inside of a microcomputer chip or in memory external to the microcomputer or in a combination of internal and external memory. Similarly, analog signals can be digitized by a stand alone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

SUMMARY

I have described a new spectrum estimation method for non-uniformly sampled signals based on recursive least squares estimation. The new method iteratively updates a spectrum estimate with each new sample, where each iteration has computational order N. I showed equivalent performance with Lomb-Scargle periodogram methods. In particular, I provided illustrative performance examples, and a detailed heart-rate variability estimation study.

Part II: Theoretical Basis for the Invention:

To better understand the inventive method, it can be helpful to first briefly review the Lomb-Scargle Transform method. Power spectrum estimators based on the Lomb-Scargle Transform, $L_N(\omega)$ do not require equal time intervals between data samples and are also therefore robust to some level of signal dropout. The LST transform is a least squares error estimate of the power as a function of frequency. Using r(n)=

$r(t_n)$ to represent the non-uniform discrete samples, $L_N(\omega)$ is defined as follows:

$$L_N(\omega) = \frac{1}{2\sigma^2} \frac{\left[\sum_i (r(i)-\bar{r})\cos\omega(t_i-\tau)\right]^2}{\sum_i \cos^2\omega(t_i-\tau)} + \frac{1}{2\sigma^2} \frac{\left[\sum_i (r(i)-\bar{r})\sin\omega(t_i-\tau)\right]^2}{\sum_i \sin^2\omega(t_i-\tau)} \quad \text{(II-1)}$$

where $\tau$ is defined by $$\tan(2\omega\tau) = \frac{\sum_i \sin 2\omega t_i}{\sum_i \cos 2\omega t_i}$$

and $$\bar{r} = \frac{1}{N}\sum_{j=0}^{N-1} r(i)$$

$$\sigma^2 = \frac{1}{N-1}\sum_{j=0}^{N-1} (r(i)-\bar{r})^2$$

The variable $t_n$ is typically time, but can also represent a discrete value of any other continuous variable such as space. While a fast algorithm with complexity on the same order as an FFT exists for this transform, it is still computationally intensive and not as suitable for "real-time" signal processing.

Returning to the invention, to arrive at the new iterative method for estimating data spectrums using recursive least squares (RFT) optimization, I made two assumptions:

(1) time sample intervals are not equally spaced, and (2) time sample interval measurement is quantized.

I still view time as a continuous variable, but I sample at unequal intervals measured using a smaller, uniform (quantized) time period. In other words, the time resolution is finite. Using assumptions (1) and (2), 1 surprisingly realized that the RFT approach can be applied to more efficiently solve the problem of producing a frequency spectrum (also referred to interchangeably herein as frequency estimate and frequency estimating) from non-uniformly spaced data and/or data having missing points in time.

According to my best present understanding of the underlying mathematical theory, I now describe the inventive method in more detail and show how I arrived at one embodiment of the inventive method, equation 8. Turning first to vector/matrix equation 2 below, the time samples (lower case r) are arranged as vector r on the left side of the equation and the frequency coefficients (upper case "R") arranged as column vector R on the right side of the equation. The capital R values of vector R are the Fourier frequency domain coefficients that are to be computed or estimated. These frequency coefficients are generally complex numbers. The w values of the w vector represent the "discrete" complex Fourier exponential frequencies. Unless otherwise indicated, all vectors are by convention column vectors. A capital T used as a superscript indicates a "transpose" operation that converts a column vector to a row vector. E.g. $w^T$ is the exact same vector in terms of values as w, except the values of $w^T$ exist as a row. I make the assumption that the r data points are sampled at quantized time instants, yet not equally spaced in time, and generally I assign equally spaced frequency values w, but this is not required when some coefficients are known a priori.

In the equations that follow, I assume a finite time resolution, while sampling data r at a non-uniform spacing in time. The vector/matrix equations, $$r(n) = \begin{bmatrix} r(t_1) \\ r(t_2) \\ \vdots \\ r(t_n) \end{bmatrix} \quad \text{(II-2)}$$

$$= \frac{1}{N}\begin{bmatrix} w^T(1) \\ w^T(2) \\ \vdots \\ w^T(n) \end{bmatrix}\begin{bmatrix} R_0(n) \\ R_1(n) \\ \vdots \\ R_{N-1}(n) \end{bmatrix}$$

$$= \frac{1}{N}W(n)R(n)$$

represent a general inverse transform from N discrete frequency coefficients, $R_k(n)$, corresponding to frequencies $f_k$, to discrete time samples, $r(t_n)$, where $$w^T(n)=[w_0(n)w_1(n)\ldots w_{N-1}(n)]$$

$$w_k(n)=e^{j2\pi f_k t_n} \text{ and } j=\sqrt{-1}$$

For the analysis below, also assume equally spaced discrete frequencies, $$f_k = \frac{kf_s}{N}$$

for $k=0, 1, \ldots, N-1$, and unequally spaced, but quantized time samples, $t_n=j/f_s$, where $j\in\{0, 1, \ldots, \infty\}$ and $f_s$ is the sampling frequency. In this case the rows of W(n) are orthogonal despite the unequally spaced time samples, as long as no two time samples are equal modulo $N/f_s$ (in which case the rows would be equal), i.e.

$$w^T(n)*w^*(m) = \begin{cases} 0 & \text{for } t_m f_s \neq t_n f_s \mod(N) \\ N & \text{for } t_m f_s = t_n f_s \mod(N) \end{cases} \quad \text{(II-3)}$$

To further develop the inventive method, I now describe in more detail a Least Squares solution to equation 2 as ultimately shown by equation 4 below.

The weighted least mean-square error solution to equation 2 is $$R(n) = N[W'(n)\Lambda(n)W(n)]^{-1}W'(n)\Lambda(n)r(n) \quad \text{(II-4)}$$

$$= NP^{-1}(n)W'(n)\Lambda(n)r(n)$$

where $$P^{-1}(n)=[W'(n)\Lambda(n)W(n)]^{-1}$$

and W'(n) is the complex conjugate of the transpose of W(n), i.e. $W'(n)=W^T(n)^*$, and $\Lambda(n)$ is a symmetric, positive definite weighting matrix. A The capital T superscript used to indicate transpose for a matrix means that each column of the matrix becomes the corresponding row in the transposed matrix. The numerical values within any row or column do not change. The * symbol used a superscript means to take the complex conjugate of every numerical entry in the rows and columns of the matrix. $\Lambda(n)$ is often the inverse of the measurement error covariance matrix. Notice that a direct Least Squares solution as shown by equation 4 (a pseudo inverse) appears to still be extremely computationally intensive. W represents a matrix, so processing equation 4 requires transposing a matrix, matrix multiplication, and a matrix inverse calculation. In fact, equation 4 taken alone can require more computation than an equivalent Long-Scargle periodogram.

Measurements with less noise provide a greater contribution to the estimate than those with more noise, minimizing the expected mean-square error. In this case, assume r(n) is "quasi-stationary", i.e. its statistical characteristics change slowly relative to the observation window. In the iterative estimate of the spectrum frequencies, the weighting matrix discounts older measurements as "noisier" due to nonstationarity.

Now, continuing to develop the inventive method of frequency transformation for non-uniformly spaced data in time, I developed a recursive version of equation 4 as shown by equations 5 and 6. For uniformly spaced time samples $t_j = j/f_s$, $j = 0, 1, \ldots, N-1$ with $\Lambda(n) = I$ and $n = N$, equation 4 becomes the well-known forward Discrete Fourier Transform (DFT), $$R(n) = W(n)r(n) \tag{II-5}$$

because the columns of W(n) are orthogonal, and equation 2 becomes the Inverse Discrete Fourier Transform (IDFT).

Adding the next time sample, $r(n+1) = r(t_{n+1})$, equation 4 becomes $$R(n+1) = \tag{II-6}$$

$$N\left( [W'(n) \; w^*(n+1)] \Lambda(n+1) \begin{bmatrix} W(n) \\ w^T(n+1) \end{bmatrix} \right)^{-1} \times [W'(n) \; w^*(n+1)]$$

$$\Lambda(n+1) \begin{bmatrix} r(n) \\ r(n+1) \end{bmatrix}$$

where the weighting matrix $$\Lambda(n+1) = \begin{bmatrix} \lambda\Lambda(n) & 0 \\ 0 & 1 \end{bmatrix}$$

provides filtering to fade older samples relative to newer ones, where $0 < \lambda < 1$.

Algebraic manipulations of equation 5 and substitution from equation 4 yield the following recursive least squares update of the spectrum frequencies (See also Appendix A below), $$R_0 = \text{(any reasonable initial value, e.g. 0)} \tag{II-7}$$

$$P_0^{-1} = I\text{(initial value = identity matrix)}$$

$$K(n+1) = \frac{I}{\lambda} - \frac{P^{-1}(n)w^*(n+1)w(n+1)^T}{\lambda^2 + \lambda w^T(n+1)P^{-1}(n)w^*(n+1)}$$

$$P^{-1}(n+1) = K(n+1)P^{-1}(n)$$

$$R(n+1) = \lambda K(n+1)R(n) + NP^{-1}(n+1)w^*(n+1)r(n+1)$$

-continued $$R(n+1) =$$

$$R(n) + \left( Nr(n+1)P^{-1}(n+1) - \frac{w(n+1)^T R(n)P^{-1}(n)}{\lambda + w^T(n+1)P^{-1}(n)w^*(n+1)} \right)$$

$$w^*(n+1)$$

Matrix by matrix multiplications and inversions imply that this iteration still has complexity of order $N^3$. However, modifications described below eliminate most of these multiplications.

Notice that while equation 4 is an "off-line" solution that can be processed only after data is collected, the recursive version shown by equation 6 is now an "on-line" solution, more suitable for "real-time" applications. Equation 6, however, is still relatively computationally intensive. The P matrix, for example, an autocorrelation matrix, can now be done iteratively, however there are still computationally intensive matrix updates required for frequency matrix R computation.

Even though the samples are non-uniformly spaced, I noticed that the frequency rows are still orthogonal. Then assuming the frequencies are so uniformly spaced, surprisingly, I realized that the matrix multiplications can be eliminated. As shown below in equation 8 for one embodiment of the inventive method, I was now able to transform computationally demanding equation 6 into equation 8 where instead of performing costly matrix operations, now only the scalar eigenvalues of the matrix are updated, a two orders of magnitude more efficient mathematical operation.

Mathematical induction proves that w (i) is always an eigenvector of $P^{-1}(n)$ (See appendix A below). The induction step yields the following iterative update for these eigenvalues, $$\varepsilon_k(n+1) = \begin{cases} \dfrac{\varepsilon_k(n)}{\lambda} & \text{when } w^T(n+1)w^*(i) = 0 \\[6pt] \dfrac{\varepsilon_k(n)}{\lambda + N\varepsilon_k(n)} & \text{when } w^T(n+1)w^*(i) = N \end{cases} \tag{II-8}$$

where $k = t_j f_s \bmod(N)$.

Use this eigenvalue iteration to eliminate explicit matrix arithmetic with $P^{-1}(n)$ and the iterative update of $P^{-1}(n)$ in equation 6. The recursive least squares method becomes $$R(0) = \text{(any reasonable initial value e.g. 0)} \tag{II-9}$$

$$\varepsilon_i(0) = 1 \text{ for } i = 0, 1, \ldots, N-1$$

$$\varepsilon_i(n+1) = \frac{\varepsilon_i(n)}{\lambda} \text{ for all } i \neq t_{n+1}f_s \bmod(N)$$

$$\varepsilon_k(n+1) = \frac{\varepsilon_k(n)}{\lambda + N\varepsilon_k(n)} \text{ for } k = t_{n+1}f_s \bmod(N)$$

$$R(n+1) = R(n) + \varepsilon_k(n+1)(Nr(n+1) - w^T(n+1)R(n))w^*(n+1)$$

All matrix arithmetic using $P^{-1}(n)$ has been eliminated and iterative updating of this matrix has been replaced by iterative updating of its eigenvalues, i.e. scalars can be seen by EQ II-8. The iteration includes a single inner product of vectors of length N and scale/add of two vectors of length N, so the iterative update now has complexity of order N. As can be seen by EQ II-9 by simply computing a scalar prediction error weighted by the scalar eigenvalue and then multiplying the resulting scalar times a vector and adding vectors, all of the frequencies can be produced. An appendix A below provides to the best of my present understanding, more algebraic detail regarding equations 6 and 8 for those especially skilled in the art.

Because $w^T(n+1)R(n)/N$ is an inverse DFT calculated at one time point, the term $r(n+1)-w^T(n+1)R(n)/N$ in EQ. II-9 is a prediction error that measures how well an inverse DFT evaluated at time $k=t_{n+1}f_s \mod(N)$ predicts the latest input datum $r(n+1)$ using the present estimate for the coefficients $R(n)$. The update to $R(n)$ is proportional to this error. The product of $\epsilon_k(n)$ and the prediction error is a scalar weighting factor for $w(n+1)$ that additively updates $R(n)$. If the inverse DFT of $R(n)$ predicts the new data sample well, or $\epsilon_k(n)$ is small, then $R(n)$ changes little.

The forgetting factor $\lambda$ determines whether or not the eigenvalues ($\epsilon_i(n)$ and $\epsilon_k(n)$) in EQ. II-9 grow without bound or converge to 0. If $\lambda=1$, i.e. no forgetting of old data, each $\epsilon_i(n)$ stays constant, while $\epsilon_k(n+1)<\epsilon_k(n)<1/N$ for all values of $\epsilon_k(n)$. If all values for $k$ are equally likely, then all eigenvalues will eventually converge to 0. Because the estimate of $R(n)$ weights all data samples equally and each new data sample becomes a smaller fraction of all data samples, it makes sense that the prediction error weight $\epsilon_k(n+1)$ continually shrinks.

However, we would like the estimator to discount old data in order to adapt to quasi-stationary conditions, so in general, $0<\lambda<1$. In this case, each $\epsilon_i(n)$ in EQ. II-9 grows larger with each iteration, while $\epsilon_k(n)$ shrinks. If the forgetting factor is very small, $\epsilon_k(n)$ will in general be large and $\epsilon_k(n+1) \approx 1/N$. This implies that the exact value of the forgetting factor is not important, and that we could assume $\epsilon_k(n+1)=1/N$ and remarkably remove the eigenvalue updates completely. The fast update method becomes.

$R(0)=$(any reasonable initial value, e.g. 0)

$$R(n+1)=R(n)+(r(n+1)-w^T(n+1)R(n)/N)w^*(n+1) \quad \text{(II-10)}$$

FIG. 2 shows a signal flow diagram for this method, where equivalently the iteration is shown from n-1 to n. Because $w^T(n)$ is always a selection from the same finite set of complex sinusoidal values, computational overhead can be reduced further by storing pre-computed values in memory. Because these sinusoids are the same as used in Fast and Discrete Fourier Transforms, the same well-known methods that exploit sinusoidal function symmetries for storage efficiency will also work here (e.g. all values can be obtained trivially from a quarter cycle of values with a frequency resolution of $2\pi/N$). Each iterative update retrieves the values it needs from memory.

In the case of uniform sampling, the Fourier coefficients computed by this method converge to the discrete Fourier transform (DFT) after N iteration steps. Assume uniform sampling for N contiguous samples spaced $1/f_s$ seconds apart, in which case $k=t_n f_s \mod(N)=0, 1, 2, 3, \ldots, N-1$. Let $R_A$ represent the DFT of these N samples and $e(n)=R(n)-R_A$ represent the error between the present estimate of the frequency coefficients and the DFT. Subtracting $R_A$ from both sides of EQ. II-9 and using the fact that $r(n+1)=w^T(n+1)R_A/N$ results in the following coefficient error expression:

$$e(n+1) = e(n) - (w^T(n+1)e(n)/N)w^*(n+1) \quad \text{(II-11)}$$

$$e(n+1) = \left(I - \frac{w^*(n+1)w^T(n+1)}{N}\right)e(n)$$

or

-continued $$e(n+1) = \prod_{i=0}^{n}\left(I - \frac{w^*(i+1)w^T(i+1)}{N}\right)e(0) \quad \text{(II-12)}$$

Then $$e(N) = \prod_{i=0}^{N-1}\left(I - \frac{w^*(i+1)w^T(i+1)}{N}\right)e(0) \quad \text{(II-13)}$$

$$= \left(I - \frac{w^*(1)w^T(1)}{N}\right)\left(I - \frac{w^*(2)w^T(2)}{N}\right)\cdots$$

$$\left(I - \frac{w^*(N)w^T(N)}{N}\right)e(0)$$

$$= \left(I - \frac{w^*(1)w^T(1)}{N} - \frac{w^*(2)w^T(2)}{N} \cdots - \frac{w^*(N)w^T(N)}{N}\right)e(0)$$

where the last equality follows from the fact that w(1), w(2), ... w(N) are orthogonal in the case of uniform sampling. Further simplification leads to.

$$e(N) = \left(I - \frac{W'(N)W(N)}{N}\right)e(0) \quad \text{(II-14)}$$

$$= (I-I)e(0)$$

$$= 0$$

where W'(N) is the DFT matrix of EQ. II-5 that is well known to have orthogonal rows and columns. Therefore the error is 0 after N iterations.

A priori information about $R(n)$ may further reduce the amount of computation implied by EQ II-9. If we know that certain frequency bands in $r(n)$ are 0, for example, we can remove those frequencies from $w(n)$ and the corresponding coefficients from $R(n)$. N is the number of remaining non-zero frequencies or the remaining length of $R(n)$.

The inventive iterative method for estimating data spectrums using recursive least squares (RFT) optimization as described above and in Appendix A, has been described according to my best present understanding. Although the theoretical description given herein is thought to be correct, the operation of the recursive least squares (RFT) optimization method described and claimed herein does not depend upon the accuracy or validity of the theoretical description or mathematical development and derivation. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

APPENDIX A: Algebraic Detail

The following sections A and B provide more algebraic detail for those skilled in the art. Section A, beginning with equations 5 and 6, shows how to derive the iterative update. Section B proves by mathematical induction that $w^*(j)$ is always an eigenvector of $P^{-1}(j)$ at any time $j=0, 1, \ldots, \infty$.

Section A, Equation (6): (For matrix A and vectors u and v, the following matrix inverse formula is useful:

$$(\lambda A + uv^T)^{-1} = \frac{A^{-1}}{\lambda} - \frac{A^{-1}uv^TA^{-1}}{\lambda^2 + \lambda v^TA^{-1}u}$$

Simplifying equation 5, $$R(n+1) = N[\lambda P(n) + w^*(n+1)w^T(n+1)]^{-1} \times [W'(n) \quad w^*(n+1)] \quad \text{(II-15)}$$

$$\Lambda(n+1)\begin{bmatrix} r(n) \\ r(n+1) \end{bmatrix}$$

$$R(n+1) = N\left(\frac{P^{-1}(n)}{\lambda} - \frac{P^{-1}(n)w^*(n+1)w(n+1)^T P^{-1}(n)}{\lambda^2 + \lambda w(n+1)^T P^{-1}(n)w^*(n+1)}\right)$$

$$(\lambda W'(n)\Lambda(n)r(n) + w^*(n+1)r(n+1))$$

$$R(n+1) = NK(n+1)P^{-1}(n)\lambda W'(n)\Lambda(n)r(n) +$$

$$NP^{-1}(n+1)w^*(n+1)r(n+1)$$

where $$K(n+1) = \frac{I}{\lambda} - \frac{P^{-1}(n)w^*(n+1)w^T(n+1)}{\lambda^2 + \lambda w^T(n+1)P^{-1}(n)w^*(n+1)}$$

Substitute equation 4 into equation 10 to arrive at the iterative update, $$R(n+1) = \lambda K(n+1)R(n) + NP^{-1}(n+1)w^*(n+1)r(n+1) \quad (1)$$

Section B, Equation (8):

This section proves by mathematical induction that $w^*(i)$ is always an eigenvector of $P^{-1}(n)$ at any time $i=0, 1, \ldots, \infty$. Because time is sampled on intervals of $1/f_s$, there are only N unique time points, i.e. for each time, $t_i$ there is a corresponding $k \in \{0, 1, \ldots, N\}$ such that $t_i f_s = k \mod(N)$.

Because $P^{-1}(0) = I$, $w^*(j)$ is an eigenvector of $P^{-1}(0)$ with eigenvalue, $\epsilon_k(n) = 1$ for $n=0$ for $t_n f_s = k \mod(N)$. Thus the claim is true for $n=0$.

Assume that $w^*(i)$ is an eigenvector of $P^{-1}(n)$ with eigenvalue, $\epsilon_k(n)$ where $t_n f_s = k \mod(N)$. The iterative update for $P^{-1}(n)$ from equation 6 implies, $$P^{-1}(n+1)w^*(i) = K(n+1)P^{-1}(n)w^*(i)$$

$$P^{-1}(n+1)w^*(i) = \epsilon_k(n)K(n+1)w^*(i)$$

and $$K(n+1)w^*(i) = \begin{cases} \dfrac{w^*(i)}{\lambda} & \text{for } w^T(n+1)w^*(i) = 0 \\ \dfrac{1}{\lambda + N\epsilon_k(n)}w^*(i) & \text{for } w^T(n+1)w^*(i) = N \end{cases} \quad \text{(II-16)}$$

Thus $$P^{-1}(n+1)w^*(i) = \begin{cases} \dfrac{\epsilon_k(n)w^*(i)}{\lambda} & \text{for } w^T(n+1)w^*(i) = 0 \\ \dfrac{\epsilon_k(n)}{\lambda + N\epsilon_k(n)}w^*(i) & \text{for } w^T(n+1)w^*(i) = N \end{cases} \quad \text{(II-17)}$$

Therefore $w^*(i)$ is also an eigenvector of $P^{-1}(n+1)$ with eigenvalue, $$\epsilon_k(n+1) = \begin{cases} \dfrac{\epsilon_k(n)}{\lambda} & \text{when } w^T(n+1)w^*(i) = 0 \\ \dfrac{\epsilon_k(n)}{\lambda + N\epsilon_k(n)} & \text{when } w^T(n+1)w^*(i) = N \end{cases} \quad \text{(II-18)}$$

APPENDIX B: Primer on the Universality of Transformations

Transformations involving units other than time and frequency can be similarly viewed from a mathematical viewpoint. This viewpoint holds regardless of the interpretation of any particular data being considered, or the chosen units of the data.

Time is only one interpretation for the independent variable. For most people, "frequency domain" makes intuitive sense for time, because "frequency" is commonly defined in terms of time, namely cycles per unit of time. The intuitive notion of "transformation" is that a time function u(t) can be represented as a weighted sum of sinusoidal time functions such as sin(ft) and cos(ft). In the sum, the weights or coefficients for each sinusoidal function with frequency "f" are the transform values and may be complex numbers. However, the time function u(t) can be considered more generally as any function of some variable t with any interpretation for t and u(t). The weights in this case are exactly the same for each "frequency", however frequency is now defined more generally than the "cycles per unit of time" corresponding to true time.

The "technical value" of a more general "frequency domain" is similar to what it is for decomposing a time function into a weighted sum of sinusoids. Thus, more generally, a transformation can be viewed as representing one particular function as the weighted sum of a set of other functions, where the weights in the sum are the transformation. If the functions are sinusoids (sin ( ) cos( ), or complex exponentials), the weights represent some kind of Fourier transform. If the independent variable is time, the transformation weights represent the common notion of frequency. If not, it is a more general notion of frequency. For example, if the functions in the sum are something else, say Wavelets, the weights represent a Wavelet transform.

I claim:

1. A method for transforming physiological data from a time domain to a frequency domain, including the steps of:
   (a) providing a plurality of physiological data in the time domain;
   (b) providing a microcomputer programmed to run a recursive Fourier transform estimation algorithm;
   (c) initializing a plurality of frequency coefficients;
   (d) receiving said data in the time domain;
   (e) calculating, for each newly received data point in the time domain, an integer index using modulo(N) arithmetic based on a time said each newly received data point was received;
   (f) selecting a frequency vector from a plurality of N frequency vectors using said integer index;
   (g) updating a plurality of frequency coefficients according to a recursive equation including said selected frequency vector as an input variable;
   (h) performing iteratively steps (d) to (g) thereby transforming said received data in the time domain to data in the frequency domain; and (i) recording said data in the frequency domain for later use as output or as data for display to a user to allow the user to more easily distinguish a diseased state of a patient based on the displayed physiological data in the frequency domain as compared to the received physiological data in the time domain.

2. The method of claim 1, wherein said recursive equation of step (g) comprises an equation $R(n)=F(R(n-1),r(n),w(n))$, where R comprises a set of frequency coefficients, $r(n)$ comprises a value of said each newly received data point in the time domain, and $w(n)$ comprises said selected frequency vector.

3. The method of claim 2, wherein said equation $R(n)=F(R(n-1),r(n),w(n))$ comprises an equation $R(n)=R(n-1)+(r(n)-w.\sup.T(n)R(n-1)/N)w^*(n)$.

4. The method of claim 2, wherein said equation $R(n)=F(R(n-1),r(n),w(n))$ comprises an equation $R(n+1)=R(n)+.epsilon..sub.k(n+1)(Nr(n+1)-w.\sup.T(n+1)R(n))w^*(n+1)-$.

5. The method of claim 2, wherein for said each newly received data point in the time domain only a selected subset of said set of frequency coefficients is updated.

6. The method of claim 1, wherein said integer index using modulo(N) arithmetic of step (e) comprises an equation $k=t.sub.jf.sub.s mod(N)$, where N represents a number of frequency vectors.

7. The method of claim 1, wherein step (d) comprises receiving data wherein said data is discrete data that occurs at a quantized measurement period in time, and said data is not equally spaced in time.

8. The method of claim 1, wherein step (h) further comprises a recursive computation using data from only within a sliding time window.

9. The method of claim 1, wherein step (h) further comprises discounting older data inversely proportional to how far in the past said older data was observed.

10. The method of claim 1, wherein step (g) comprises calculating a prediction error using a present set of coefficients in the in the frequency domain times a vector and applying vector addition to generate a new updated set of coefficients in the frequency domain.

11. The method of claim 10, wherein step (g) comprises the term: $(r(n)-w.\sup.T(n)R(n-1)N)$.

12. The method of claim 1, wherein step (g) comprises computing with a complexity of order N a set of coefficients in the frequency domain.

13. The method of claim 1, wherein said time data comprises at least one time domain signal representing physiological signals from a heart.

14. The method of claim 13, further including the step of: (h), diagnosing a condition of a human heart based on the recorded data in the in the second domain produced by step (g), and wherein said second domain is the frequency domain.

15. An apparatus to transform data representing at least one time domain signal to data in the frequency domain including:
an electronic circuit configured to receive physiological data representing at least one time domain signal;
a microcomputer in communication with said electronic circuit; and
a computer program recorded on a machine-readable medium, said computer program configured to perform the steps of a recursive Fourier transform estimation algorithm when running on said microcomputer,
wherein said apparatus is configured to calculate, for each newly received data point in the time domain, an integer index using modulo(N) arithmetic based on a time said each newly received data point was received,
to select a frequency vector from a plurality of N frequency vectors using said integer index, and to update a plurality of frequency coefficients according to a recursive equation including said selected frequency vector as an input variable,
to transform said digital data representing at least one time domain signal to data in the frequency domain, and to record said data in the frequency domain for later use as output or as data for display to a user to allow the user to more easily distinguish a diseased state of a patient based on the displayed physiological data in the frequency domain as compared to the received physiological data in the time domain.

16. The apparatus of claim 15, wherein said computer program configured to perform the steps of a recursive Fourier estimation algorithm when running on said microcomputer is configured to compute with a complexity of order N the equation $R(n)=F(R(n-1),r(n),w(n))$, where R comprises a set of frequency coefficients, $r(n)$ comprises a value of said each newly received data point in the time domain, and $w(n)$ comprises said selected frequency vector.

17. The apparatus of claim 16, wherein said equation $R(n)=F(R(n-1),r(n),w(n))$ comprises an equation $R(n)=R(n-1)+(r(n)w.\sup.T(n)R(n-1)/N)w^*(n)$.

18. The apparatus of claim 16, wherein said equation $R(n)=F(R(n-1),r(n),w(n))$ comprises an equation $R(n+1)=R(n)+.epsilon..sub.k(n+1)(Nr(n+1)-w.\sup.T(n/1)R(n))w^*(n+1)-$.

19. The apparatus of claim 15, wherein to calculate, for each newly received data point in the time domain, an integer index using modulo(N) arithmetic comprises an equation $k=t.sub.jf.sub.s mod(N)$, where N represents a number of frequency vectors.

20. The apparatus of claim 15, wherein said apparatus comprises an electrocardiogram ("ECG") apparatus and said data is representative of the operation of a heart.

21. The apparatus of claim 20, wherein said data representative of the operation of a heart comprises data missing one or more data elements in a time series.

22. The apparatus of claim 15, wherein said electronic circuit configured to receive data further comprises a comparator configured to receive a datum when a signal of interest crosses a preset threshold.

23. The method of claim 16, wherein for said each newly received data point in the time domain only a selected subset of said set of frequency coefficients is updated.

* * * * *